(12) United States Patent
Horigome

(10) Patent No.: US 8,693,298 B2
(45) Date of Patent: *Apr. 8, 2014

(54) RECORDING APPARATUS AND RECORDING METHOD

(75) Inventor: Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 223 days.

This patent is subject to a terminal disclaimer.

(21) Appl. No.: 13/282,945

(22) Filed: Oct. 27, 2011

(65) Prior Publication Data

US 2012/0113777 A1    May 10, 2012

(30) Foreign Application Priority Data

Nov. 5, 2010   (JP) .................................. 2010-248433

(51) Int. Cl.
  *G11B 5/55*    (2006.01)
(52) U.S. Cl.
  USPC ........................................ 369/53.28; 369/94
(58) Field of Classification Search
  None
  See application file for complete search history.

(56) References Cited

U.S. PATENT DOCUMENTS

| 8,363,522 B2* | 1/2013 | Ishimoto et al. ............ 369/47.15 |
| 2002/0131360 A1* | 9/2002 | Takemura et al. ......... 369/275.3 |
| 2008/0186840 A1 | 8/2008 | Uchiyama et al. |
| 2008/0205257 A1 | 8/2008 | Yamatsu et al. |

FOREIGN PATENT DOCUMENTS

| JP | 2008-135144 A | 6/2008 |
| JP | 2008-176902 A | 7/2008 |

* cited by examiner

*Primary Examiner* — Srilakshmi K Kumar
*Assistant Examiner* — Carl Adams
(74) *Attorney, Agent, or Firm* — Wolf, Greenfield & Sacks, P.C.

(57) ABSTRACT

A recording apparatus includes: a light illumination and light sensing unit configured to illuminate an optical disc recording medium including a reference surface having address information recorded and a recording layer, with recording light and light for position control; a recording unit which performs recording on the recording layer; and a control unit which controls, when data instructed to be recorded is to be recorded from an instructed recording start address, the recording unit to perform recording of dummy data on an area adjacent to a front side at least from the recording start address over a range of equal to or greater than the maximum spot deviation amount between an illumination spot of the light for position control and an illumination spot of the recording light and to perform recording of the data instructed to be recorded in succession to a recorded area of the dummy data.

8 Claims, 24 Drawing Sheets

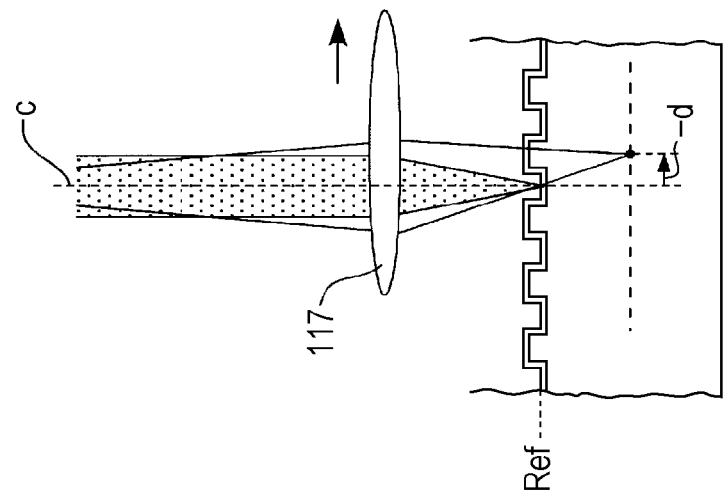
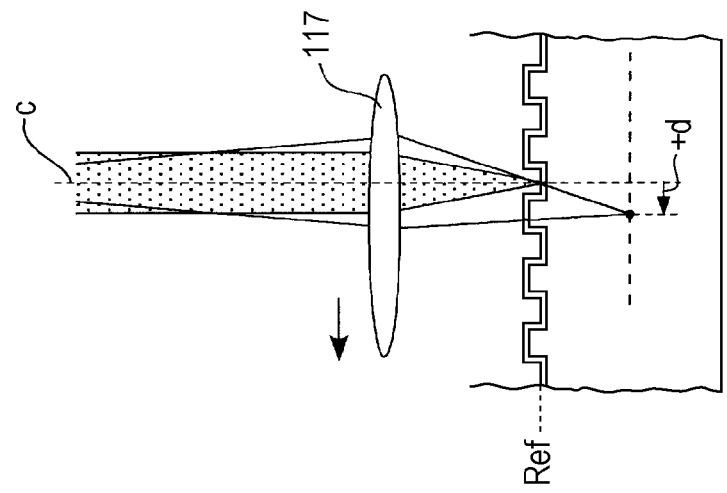
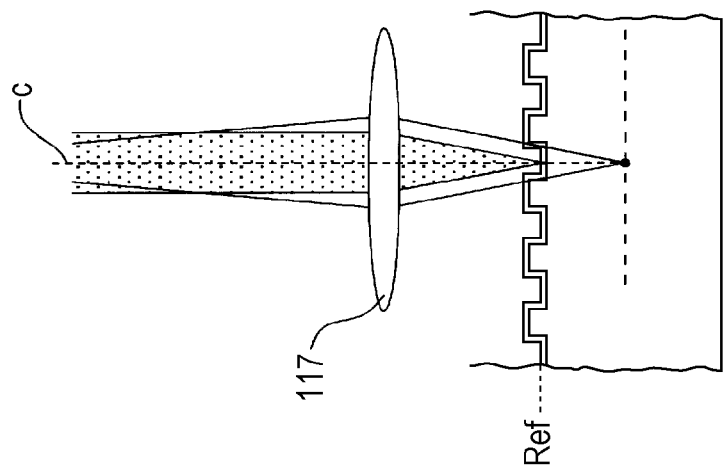

RECORDING APPARATUS AND RECORDING METHOD

BACKGROUND

The present disclosure relates to a recording apparatus configured to illuminate an optical disc recording medium having a reference surface on which address information is recorded by formation of a position guiding element and a recording layer which is formed at a different depth position from that of the reference surface, with recording light for performing mark recording on the recording layer and light for position control for performing position control based on the position guiding element formed on the reference surface, via a common objective lens, and a method thereof.

As optical disc recording media (optical discs) for recording and reproducing signals by light illumination, for example, CDs (Compact Discs), DVDs (Digital Versatile Discs), and BDs (Blu-ray Discs: registered trademark) have been popularized.

With regard to the next-generation optical discs of the currently popularized optical discs such as CDs, DVDs, and BDs, the applicant has previously proposed a so-called bulk recording-type optical disc as disclosed in Japanese Unexamined Patent Application Publication No. 2008-135144 and Japanese Unexamined Patent Application Publication No. 2008-176902.

Here, bulk recording is, for example, a technique for performing multi-layer recording on a bulk layer 102 by performing laser light illumination while sequentially changing focal positions in an optical recording medium (a bulk-type recording medium 100) having at least a cover layer 101 and the bulk layer (recording layer) 102 as illustrated in FIG. 19, thereby achieving an increase in recording capacity.

For the bulk recording, in Japanese Unexamined Patent Application Publication No. 2008-135144, a recording technique called a microhologram method is disclosed.

In the microhologram method, as a recording material of the bulk layer 102, a so-called hologram recording material is used. As the hologram recording material, for example, photopolymerizable polymer or the like is widely used.

The microhologram method is mainly classified into a positive-type microhologram method and a negative-type microhologram method.

The positive-type microhologram method is a technique for condensing two opposing light beams (a light beam A and a light beam B) at the same position to form a fine fringe (hologram) which becomes a recording mark.

In addition, the negative-type microhologram method is, using the opposite idea to the positive-type microhologram method, a technique for erasing a fringe which is formed in advance through laser light illumination to use the erasure portion as a recording mark. Specifically, in the negative-type microhologram method, before performing a recording operation, an initialization process for forming a fringe on the bulk layer 102 is performed in advance. That is, light beams C and D by parallel light are emitted to be opposed so as to form the fringes on the entirety of the bulk layer 102. In addition, after the fringe is formed in advance by the initialization process, information recording is performed by forming erasure marks. Specifically, by performing laser light illumination according to the information to be recorded in a state where laser beams are focused at an arbitrary layer position, the information recording using erasure marks is performed.

In addition, the applicant also proposes, as a bulk recording technique different from the microhologram method, a recording technique for forming voids (holes and blanks) as recording marks, for example, as disclosed in Japanese Unexamined Patent Application Publication No. 2008-176902.

The void recording method is a technique for performing laser light illumination on the bulk layer 102 made of a recording material such as photopolymerizable polymer at a relatively high power, thereby recording holes in the bulk layer 102. As disclosed in Japanese Unexamined Patent Application Publication No. 2008-176902, the hole portions formed as described above become portions having different refractive indexes from other portions in the bulk layer 102, and reflectance of light at the boundaries thereof can be enhanced. Therefore, the hole portions function as recording marks, and accordingly information recording using the formation of hole marks is realized.

In such void recording methods, since holograms are not formed, recording is done when light illumination is performed from one side. That is, unlike the positive-type microhologram method, two light beams may not be condensed at the same position to form recording marks.

In addition, in comparison to the negative-type microhologram method, there is an advantage in that an initialization process may not be performed.

In addition, in Japanese Unexamined Patent Application Publication No. 2008-176902, an example in which illumination of the light for pre-curing is performed before recording when void recording is to be performed is described. However, recording of the voids can be made even when the illumination of the light for pre-curing is omitted.

However, although various recording techniques as described above have been proposed for bulk recording-type (simply referred to as bulk-type) optical recording media, a recording layer (bulk layer) of such a bulk-type optical recording medium does not have an explicit multi-layer structure in the sense that, for example, a plurality of reflection films are formed. That is, the bulk layer 102 is not provided with a reflection film and a guiding groove that may be provided in a typical multi-layer disc for each recording layer.

Therefore, in the structure of the bulk-type recording medium 100 illustrated in FIG. 19 as it is, during recording without marks being formed, focus servo or tracking servo may not be performed.

Accordingly, in practice, the bulk-type recording medium 100 is provided with a reflection surface (reference surface Ref) which is the reference having a guiding groove as illustrated in FIG. 20.

Specifically, guiding grooves (position guiding elements) such as pits or grooves are formed on the lower surface side of the cover layer 101, and a selective reflection film 103 is formed thereon. In addition, on the lower layer side of the cover layer 101 on which the selective reflection film 103 is formed, the bulk layer 102 is laminated via an adhesive material such as UV-curable resin as an intermediate layer 104 in FIG. 20.

In addition, in this medium structure, the bulk-type recording medium 100 is, as illustrated in FIG. 21, illuminated with, separately from a laser light for recording marks (a laser light for recording), a laser light for servo as a laser light for position control.

As illustrated in FIG. 21, the laser light for recording and the laser light for servo illuminate the bulk-type recording medium 100 via a common objective lens.

Here, if the laser light for servo reaches the bulk layer 102, there is a concern that the laser light for servo may have an adverse effect on mark recording on the bulk layer 102. Accordingly, in a bulk recording method according to the related art, a laser light having a wavelength band different from that of the laser light for recording is used as the laser light for servo, and the selective reflection film 103 which has wavelength selectivity in that it reflects the laser light for servo and transmits the laser light for recording is provided as a reflection film formed on a guiding groove formation surface (reference surface Ref).

On the above-described premise, operations performed during mark recording on the bulk-type recording medium 100 will be described with reference to FIG. 21.

First, when multi-layer recording is to be performed on the bulk layer 102 without a guiding groove or a reflection film being formed, a layer position at which marks are recorded in a depth direction on the bulk layer 102 is set in advance. In FIG. 21, a case is exemplified where as layer positions at which the marks are to be formed (mark formation layer positions: also called information recording layer positions) in the bulk layer 102, first to fifth information recording layer positions L1 to L5, making a total of 5 information recording layer positions L, are set. As illustrated, the first information recording layer position L1 is set to a position at a first offset of of-L1 in a focus direction (depth direction) from the selective reflection film 103 (the reference surface Ref) provided with guiding grooves. In addition, the second, third, fourth, and fifth information recording layer positions L2, L3, L4, and L5 are respectively set to positions at second, third, fourth, and fifth offsets of of-L2, of-L3, of-L4, and of-L5 from the reference surface Ref.

During recording in which marks are not formed yet, focus servo or tracking servo may not be performed on each of the layer positions L as an object in the bulk layer 102 on the basis of reflected light of the laser light for recording. Therefore, during recording, focus servo control and tracking servo control of the objective lens are performed on the basis of the reflected light of the laser light for servo as the light for position control so that a spot position of the laser light for servo follows the guiding grooves on the reference surface Ref.

However, the laser light for recording has to reach the bulk layer 102 formed on a lower layer side in relation to the selective reflection film 103 for mark recording. Accordingly, in this optical system, separately from a focus mechanism of the objective lens, a focus mechanism is provided for independently adjusting a focal position of the laser light for recording.

Here, an internal configuration example of the recording apparatus of the bulk-type recording medium 100 including the mechanism for independently adjusting the focal position of the laser light for recording is illustrated in FIG. 22.

In FIG. 22, a first laser diode 111 denoted by LD1 in FIG. 22 is a light source of the laser light for recording, and a second laser diode 119 denoted by LD2 is a light source of the laser light for servo. As understood from the above description, the first and second laser diodes 111 and 119 are adopted to emit laser lights having different wavelength bands from each other.

As illustrated in FIG. 22, the laser light for recording emitted by the first laser diode 111 is incident on the focus mechanism constituted by a fixed lens 113, a movable lens 114, and a lens driving unit 115 via a collimation lens 112. As the movable lens 114 is driven by the lens driving unit 115 in a direction parallel to an optical axis of the laser light for recording, the collimation state (convergent, parallel, or divergent state) of the laser light for recording incident on an objective lens 117 in FIG. 22 is changed, so that the focal position of the laser light for recording can be adjusted independently from a change in focal position that is caused by driving the objective lens 117.

In this sense, the focus mechanism is also referred to as a focus mechanism for a recording light.

The laser light for recording transmitted via the focus mechanism for a recording light is incident on a dichroic mirror (dichroic prism) 116 adopted to transmit light having the same wavelength band as that of the laser light for recording and reflect light having different wavelength bands.

As illustrated, the laser light for recording transmitting the dichroic mirror 116 illuminates the bulk-type recording medium 100 via the objective lens 117. The objective lens 117 is held to be displaced in a focus direction and a tracking direction by a biaxial actuator 118.

In addition, the laser light for servo emitted by the second laser diode 119 is transmitted through a beam splitter 121 via a collimation lens 120 and is incident on the above-mentioned dichroic mirror 116. The laser light for servo reflects from the dichroic mirror 116 and is incident on the objective lens 117 so that its optical axis is aligned with the optical axis of the laser light for recording transmitting the dichroic mirror 116.

The laser light for servo incident on the objective lens 117 is focused on the selective reflection film 103 (the reference surface Ref) of the bulk-type recording medium 100 as the biaxial actuator 118 is driven under focus servo control by a servo circuit 125 described later. Simultaneously, the position of the laser light for servo in the tracking direction is caused to follow the guiding groove formed on the selective reflection film 103 as the biaxial actuator 118 is driven under tracking servo control by the servo circuit 125.

The reflected light of the laser light for servo reflected from the selective reflection film 103 is reflected from the dichroic mirror 116 via the objective lens 117 and is then reflected again from the beam splitter 121. The reflected light of the laser light for servo reflected from the beam splitter 121 is condensed on a detection surface of a photodetector 123 via a condenser lens 122.

A matrix circuit 124 generates focusing and tracking error signals on the basis of light sensing signals detected by the photodetector 123 and supplies the error signals to the servo circuit 125.

The servo circuit 125 generates a focus servo signal and a tracking servo signal from the error signals. As the above-mentioned biaxial actuator 118 is driven on the basis of the focus servo signal and the tracking error signal, the focus servo control and the tracking servo control of the objective lens 117 are realized.

Here, when mark recording is to be performed on a given information recording layer position L as an object selected from among the information recording layers position L set in advance in the bulk-type recording medium 100, the operation of the lens driving unit 115 is controlled to change the focal position of the laser light for recording by the offset of corresponding to the selected information recording layer position L.

Specifically, setting control of such an information recording position is performed by, for example, a controller 126 that controls the entire recording apparatus. That is, the operation of the lens driving unit 115 is controlled by the controller 126 on the basis of an offset amount of-L set in advance according to the information recording layer Ln as the object, thereby setting the information recording position (focal position) of the laser light for recording to the information recording layer position Ln which is the object.

In addition, during recording, the tracking servo of the laser light for recording is automatically performed as the tracking servo control of the objective lens 117 is performed by the servo circuit 125 on the basis of the reflected light of the laser light for servo as described above. Specifically, the spot position of the laser light for recording in the tracking direction is controlled to be immediately under the guiding groove formed on the reference surface Ref.

Moreover, when the bulk-type recording medium 100 on which the mark recording is already performed is reproduced, the position of the objective lens 117 may not be controlled on the basis of the reflected light of the laser light for servo from a reference surface Ref unlike during recording. That is, during reproduction, mark rows as objects formed on the information recording layer position L as a reproduction object are illuminated with a laser light for reproduction, thereby performing the focus servo control and the tracking servo control of the objective lens 117 on the basis of the reflected light of the laser light for reproduction.

As described above, in the bulk recording method, the bulk-type recording medium 100 is illuminated with the laser light for recording as the mark recording light and the laser light for servo as the light for position control via the common objective lens 117 (to be combined on the same optical axis). Thereafter, the focus servo control and the tracking servo control of the objective lens 117 are performed on the basis of the reflected light of the laser light for servo, so that the focus servo and the tracking servo of the laser light for recording can be performed even though the guiding grooves or a reflection surface having the guiding groove formed therein are not formed on the bulk layer 102.

However, when the servo control technique as described above is employed, there is a problem in that due to a lens shift of the objective lens 117 caused by the eccentricity of the bulk-type recording medium 100, a deviation in the information recording position in the tracking direction occurs.

FIGS. 23A to 23C are diagrams illustrating principles of generating deviations of the information recording position caused by the lens shift as described above.

In FIGS. 23A to 23C, FIG. 23A illustrates an ideal state in which there is no eccentricity of the bulk-type recording medium 100 and a lens shift of the objective lens 117 does not occur. FIG. 23B illustrates a case where a lens shift (referred to as (+) direction eccentricity) occurs in the left direction of the figure (referred to as the outer peripheral direction). FIG. 23C illustrates a case where a lens shift (referred to as (−) direction eccentricity) occurs in the right direction of the figure (referred to as the inner peripheral direction).

First, the center axis c in FIGS. 23A to 23C is a center axis set to design an optical system, and in the ideal state illustrated in FIG. 23A, the center of the objective lens 117 is aligned with the center axis c.

Contrary to this, when the lens shift in the (+) direction occurs as illustrated in FIG. 23B, the center of the objective lens 117 is shifted to the (+) direction with respect to the center axis c of the optical system.

Here, since the laser light for servo (a patterned light beam in FIGS. 23A to 23C) is incident on the objective lens 117 as a parallel light, even though there is a shift of the objective lens 117 from the center axis c as described above, a change in the focal position of the laser light for servo in the tracking direction does not occur. Contrary to this, since the laser light for recording (an outlined light beam in FIGS. 23A to 23C) is incident on the objective lens 117 so as not to be parallel therewith so as to be focused on the selected information recording layer position L in the bulk layer 102 on the lower layer side than the reference surface Ref as described above, by the shift of the objective lens 117 in the (+) direction as described above, as in FIG. 23B, the focal position (information recording position) of the laser light for recording is changed in the (+) direction by the lens shift amount (a deviation amount +d in FIG. 23B).

In addition, when a lens shift in the (−) direction as illustrated in FIG. 23C occurs, the information recording position of the laser light for recording is changed in the (−) direction by the lens shift amount as illustrated in FIG. 23C (a deviation amount −d in FIG. 23C).

As such, the configuration of the recording apparatus for the bulk-type recording medium 100 described above with reference to FIG. 22 is implemented so that:

the laser light for recording and the laser light for servo are illuminated via the common objective lens 117, the focus servo control of the objective lens 117 is performed to focus the laser light for servo on the reference surface Ref of the bulk-type recording medium 100, the focal position (the information recording position) of the laser light for recording is adjusted by changing the collimation state of the laser light for recording incident on the objective lens 117, and the tracking servo control of the objective lens 117 is performed to cause the focal position of the laser light for servo to follow the guiding groove formed on the reference surface Ref.

In this configuration, there is a problem in that the information recording position of the laser light for recording is deviated in the tracking direction due to the eccentricity of the disc.

Here, depending on a degree of the eccentricity or setting of a track pitch (an interval between the guiding grooves formed therein), there may be a case where the information recording positions of adjacent guiding grooves may be overlapped. In this case, a recording signal is not correctly reproduced.

In addition, the lens shift of the objective lens 117 has been described as a main factor of the deviation of the information recording position; however, the deviation of the information recording position is also caused by a disc tilt.

SUMMARY

Here, in the above description, as a problem caused by a lens shift or the like due to eccentricity, a deviation of an information recording position is exemplified. However, the phenomenon of the spot position deviation is also applied to the laser light for reproduction which illuminates via the focus mechanism for recording light (the fixed lens 113 to the movable lens 114), the dichroic mirror 116, and the objective lens 117 in this order like the laser light for recording.

Here, hitherto, when a signal recorded on a predetermined area in a certain information recording layer position L is to be reproduced from the head position (reproduction start position), first, a process for moving the reproduction start position to a target position by the laser light for servo is performed on the basis of the position information recorded on the reference surface Ref.

In addition, after the movement to the reproduction start position on the reference surface Ref, tracking servo control of the objective lens 117 is switched from tracking servo control based on the reflected light of the laser light for servo to tracking servo control based on the reflected light of the laser light for reproduction. That is, tracking servo control of a mark row recorded as an object at the information recording layer position L is performed.

Such an access process becomes effective when spot positions of the laser light for servo and the laser light for reproduction are aligned with each other in the radial direction, there is a concern that the access process may not be valid when a spot position deviation as described above occurs.

Specifically, in a case where the reproduction start position is a head position on a disc (or a head position of a zone) and a position at which a mark row is not formed on the inner peripheral side, if the spot position deviation occurs as a deviation on the inner peripheral direction side during servo switching as described above, there is a concern that the spot position of the laser light for reproduction may be positioned at the portion where the mark is not formed. In this state, pull-in of the tracking servo by the laser light for reproduction may not be possible, and as a result, access is retried from servo based on the reference surface Ref and thus the access time is significantly delayed.

FIGS. 24A and 24B are diagrams illustrating a case where a relationship between a deviation from the actual reproduction start position caused by the spot position deviation during access for reproduction described above, and a spot position deviation that occurs during recording becomes the worst.

FIG. 24A shows a form of the spot position deviation that occurs during recording, and FIG. 24B shows a form of the spot position deviation that occurs during access for reproduction.

First, as shown in FIGS. 24A and 24B, an address (• in FIGS. 24A and 24B) on the reference surface Ref representing the head position (or the head position of the zone) on the disc is assumed to be an address AD_st_ref. In addition, corresponding to this, an address (ideal address: ○ in FIGS. 24A and 24B) of the head position at the information recording layer position Ln in the bulk layer 102 is assumed to be an address AD_st_b.

As can be seen with reference to FIGS. 24A and 24B, the deviation from the actual recording start position (• in FIG. 24A: in other words, the actual reproduction start position in FIG. 24B) at the information recording layer position Ln to the spot position of the laser light for reproduction during access for reproduction becomes greatest in a case where a spot position deviation (+d) to the outer peripheral side occurs during recording and a spot position deviation (−d) to the inner peripheral side occurs during access for reproduction.

In addition, the form (direction) of the spot position deviation at the same position on the disc becomes different in a case where the disc is replaced. Specifically, for example, the case is one in which the apparatus which performs recording is different from the apparatus which performs reproduction, or the like. When the disc is replaced, as the clamped state of the disc by a spindle motor is changed, the form of the generated eccentricity is changed. Therefore, when reproduction is performed after the replacement of the disc, a situation as shown in FIGS. 24A and 24B may occur.

It is desirable to, in a case where, on an optical disc recording medium having a reference surface on which a position guiding element is formed and a recording layer formed at a different depth position from that of the reference surface, an access process (an access process for switching from reference surface tracking servo to tracking servo by light for reproduction) based on position information (address information) of the reference surface described above is performed, when reproduction is performed from a position before which an area where a mark row is not formed exists, such as a head position of a disc or a head position of a zone, prevent an illumination position of the light for reproduction from being positioned in the mark non-formation portion during servo switching, thereby preventing a significant delay of an access time which may occur according to related art.

A recording apparatus according to an embodiment of the present disclosure has the following configuration.

That is, the recording apparatus includes a light illumination and light sensing unit which is configured to illuminate an optical disc recording medium having a reference surface on which address information is recorded by formation of a position guiding element and a recording layer which is formed at a different depth position from that of the reference surface, with recording light for performing mark recording on the recording layer and light for position control for performing position control based on the position guiding element formed on the reference surface, via a common objective lens, and is configured to receive reflected light of the light for position control from the reference surface.

In addition, the recording apparatus includes a tracking mechanism which drives the objective lens in a tracking direction that is a direction parallel to a radial direction of the optical disc recording medium.

In addition, the recording apparatus includes a reference surface side tracking servo control unit which performs, by driving the tracking mechanism on the basis of a light sensing signal for the light for position control obtained by the light illumination and light sensing unit, reference surface side tracking servo control for causing an illumination spot of the light for position control to follow the position guiding element formed on the reference surface.

In addition, the recording apparatus includes a recording unit which performs recording on the recording layer by driving a light source of the recording light to emit light, and a control unit.

In addition, the control unit controls, in a state where data instructed to be recorded is to be recorded from an instructed recording start address, the recording unit to perform recording of dummy data on an area adjacent to a front side at least from the recording start address over a range of equal to or greater than the maximum spot deviation amount which is the maximum amount of a position deviation amount in the radial direction between the illumination spot of the light for position control and an illumination spot of the recording light which may occur in a state where tracking servo is performed by the reference surface side tracking servo control unit and to perform recording of the data instructed to be recorded in succession to a recorded area of the dummy data.

According to the embodiment of the disclosure as described above, recording is not simply started from a recording start address, and after recording of dummy data is performed on an area adjacent to the front side of at least the recording start address over a range of equal to or greater than the maximum spot deviation amount, data instructed to be recorded is recorded in succession to a recorded area of the dummy data.

Using the recording method as described above, even in a case where the directions of the spot position deviation during recording and during access for reproduction are reversed as shown in FIGS. 24A and 24b, it can be guaranteed that an illumination spot of reproduction light is reliably positioned in a mark formation area. Accordingly, the reproduction light is prevented from being positioned in the mark non-formation portion during access for reproduction unlike in the related art, so that switching from tracking servo control based on light for position control to tracking servo control based on the reproduction light can be smoothly performed. That is, a significant delay of the access time to the disc head (zone head) during reproduction which may occur in the related art can be prevented.

According to the embodiment, it can be guaranteed that the illumination spot of the reproduction light is reliably positioned in the mark formation portion, so that a significant delay of the access time to the disc head (the zone head) during reproduction which may occur in the related art can be prevented.

BRIEF DESCRIPTION OF THE DRAWINGS

FIGS. 23A to 23C are diagrams illustrating principles of generating deviations of an information recording position in a tracking direction due to a lens shift.

DETAILED DESCRIPTION OF EMBODIMENTS

Hereinafter, exemplary embodiments (hereinafter, referred to as embodiments) for embodying the disclosure will be described.

The description is provided in the following order:
1. First Embodiment
1-1. Example of Optical Disc Recording Medium as Recording Object
1-2. Internal Configuration of Recording Apparatus according to Embodiment
1-3. Recording Method as First Embodiment
1-4. Process Order
2. Second Embodiment
2-1. Recording Method as Second Embodiment
2-2. Process Order
3. Modified Example

Figure 1:
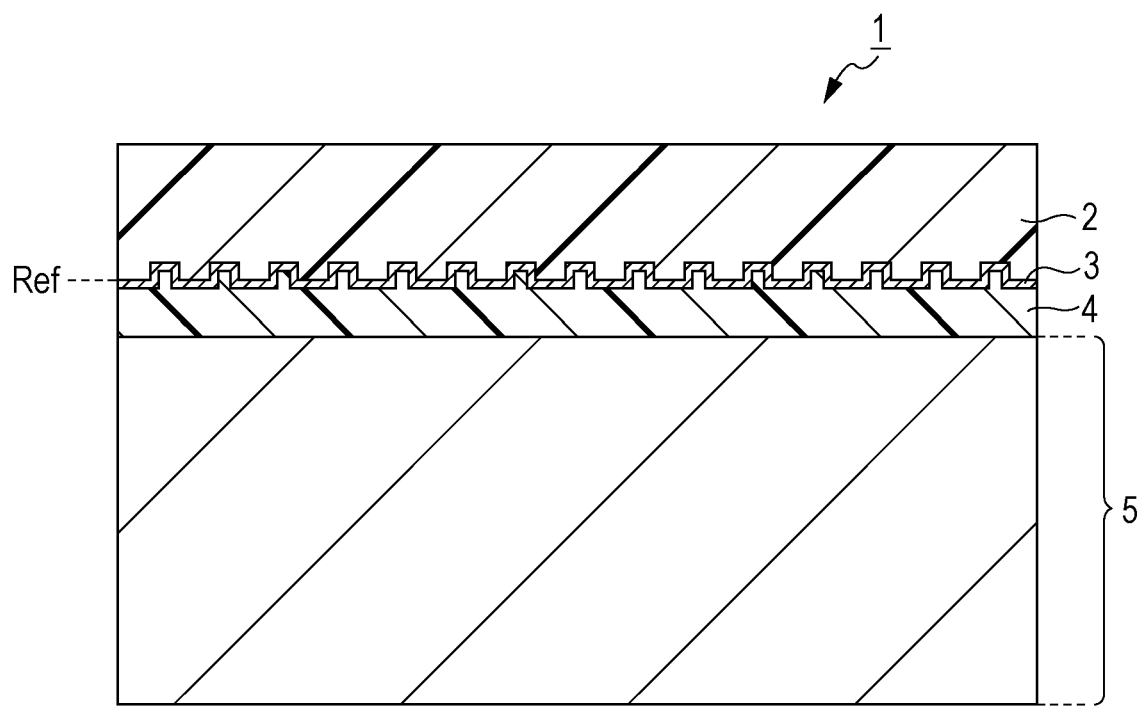
FIG. 1 is a cross-sectional view of the structure of an optical disc recording medium which is a recording object according to an embodiment.

1. First Embodiment 1-1. Example of Optical Disc Recording Medium as Recording Object FIG. 1 is a cross-sectional view of the structure of an optical disc recording medium which is used as a recording object by a recording apparatus according to an embodiment.

The optical disc recording medium which is the recording object according to the embodiment is regarded as a so-called bulk recording-type optical disc recording medium, and hereinafter, is referred to as a bulk-type recording medium 1.

The bulk-type recording medium 1 as the optical disc recording medium is illuminated with a laser light while being rotated by a recording apparatus for mark recording (information recording).

Disc-shaped recording media for recording (and reproducing) information by light illumination are generally referred to as optical disc recording media.

As illustrated in FIG. 1, in the bulk-type recording medium 1, a cover layer 2, a selective reflection film 3, an intermediate layer 4, and a bulk layer 5 are formed in this order from the upper layer side.

Here, in this specification, the "upper layer side" indicates an upper layer side when a surface on which a laser light is incident from a recording apparatus (recording apparatus 10) side according to an embodiment described later is regarded as an upper surface.

In addition, in this specification, a "depth direction" is used. The "depth direction" indicates a direction aligned with an up and down direction (vertical direction) (that is, a direction parallel with a direction of the laser light being incident by the recording apparatus: focus direction) according to the definition of the "upper layer side".

In the bulk-type recording medium 1, the cover layer 2 is made of a resin such as polycarbonate or acrylic resin, and as illustrated, on the lower surface side thereof, a position guiding element for guiding recording and reproduction positions is formed.

In this case, as the position guiding element, guiding grooves are formed as continuous grooves or a pit row. The guiding grooves are formed in a spiral shape in a disc surface.

For example, when the guiding grooves are formed as the pit row, position information (absolute position information: in this example, rotation angle information, radial position information, and the like, hereinafter also called address information) is recorded by a combination of lengths of pits and lands. On the other hand, when the guiding grooves are formed as the grooves, the grooves are periodically meandered (wobbled) to record position information on the basis of period information of the meanders.

The cover layer 2 is generated by injection molding using a stamper in which such guiding grooves (concave and convex shapes) are formed.

In addition, on the lower surface side of the cover layer 2 provided with the guiding grooves, the selective reflection film 3 is formed.

Here, as described above, in the bulk recording method, besides a recording light (laser light for recording) for performing mark recording on the bulk layer 5 as a recording layer, a servo light (light for position control, also referred to as a laser light for servo) for obtaining an error signal during tracking or focusing on the basis of the guiding grooves as described above is separately illuminated.

Here, if the servo light reaches the bulk layer 5, there is a concern that the servo light may have an adverse effect on the mark recording performed on the bulk layer 5. Therefore, a reflection film that has selectivity in that it reflects the servo light and transmits the recording light is used.

Hitherto, in the bulk recording method, as the recording light and the servo light, laser lights having different wavelength bands are used. For this, as the selective reflection film 3, a selective reflection film that has wavelength selectivity in that it reflects light having the same wavelength band as the servo light and transmits light having other wavelength bands is used.

On the lower layer side of the selective reflection film 3, for example, the bulk layer 5 as the recording layer is formed (adhered) with the intermediate layer 4 made of an adhesive material such as a UV-curable resin therebetween.

As a material (recording material) of the bulk layer 5, for example, a suitable and optimal material may be employed depending on the employed bulk recording method such as the positive-type microhologram method, the negative-type microhologram method, or the void recording method described above.

Moreover, the method of the mark recording to be performed on the optical disc recording medium as an object according to the embodiment of the disclosure is not particularly limited, and any method in the category of bulk recording methods may be employed.

Hereinafter, in this embodiment, the description will be provided by employing the void recording method.

Here, in the bulk-type recording medium 1 having the above-described configuration, the selective reflection film 3 provided with the concave and convex cross-sectional shape pattern as the above-mentioned the guiding grooves are formed becomes, as described later, a reflection surface which is a reference corresponding to position control of the laser light for recording based on the laser light for servo. In this sense, hereinafter, a surface on which the selective reflection film 3 is formed is referred to as a reference surface Ref.

Figure 21:
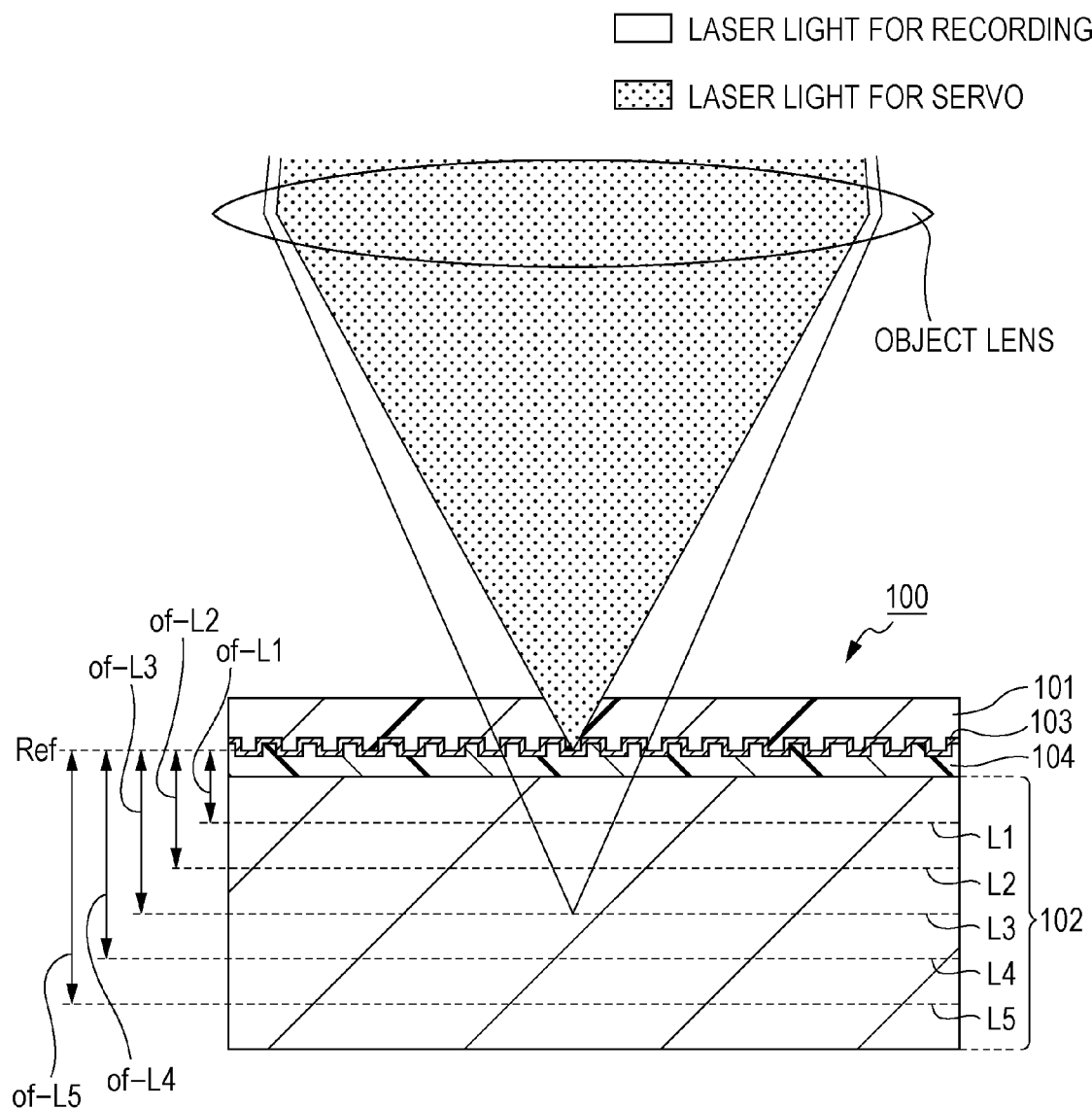
FIG. 21 is a diagram illustrating an operation during mark recording on the bulk-type recording medium.
Figure 22:
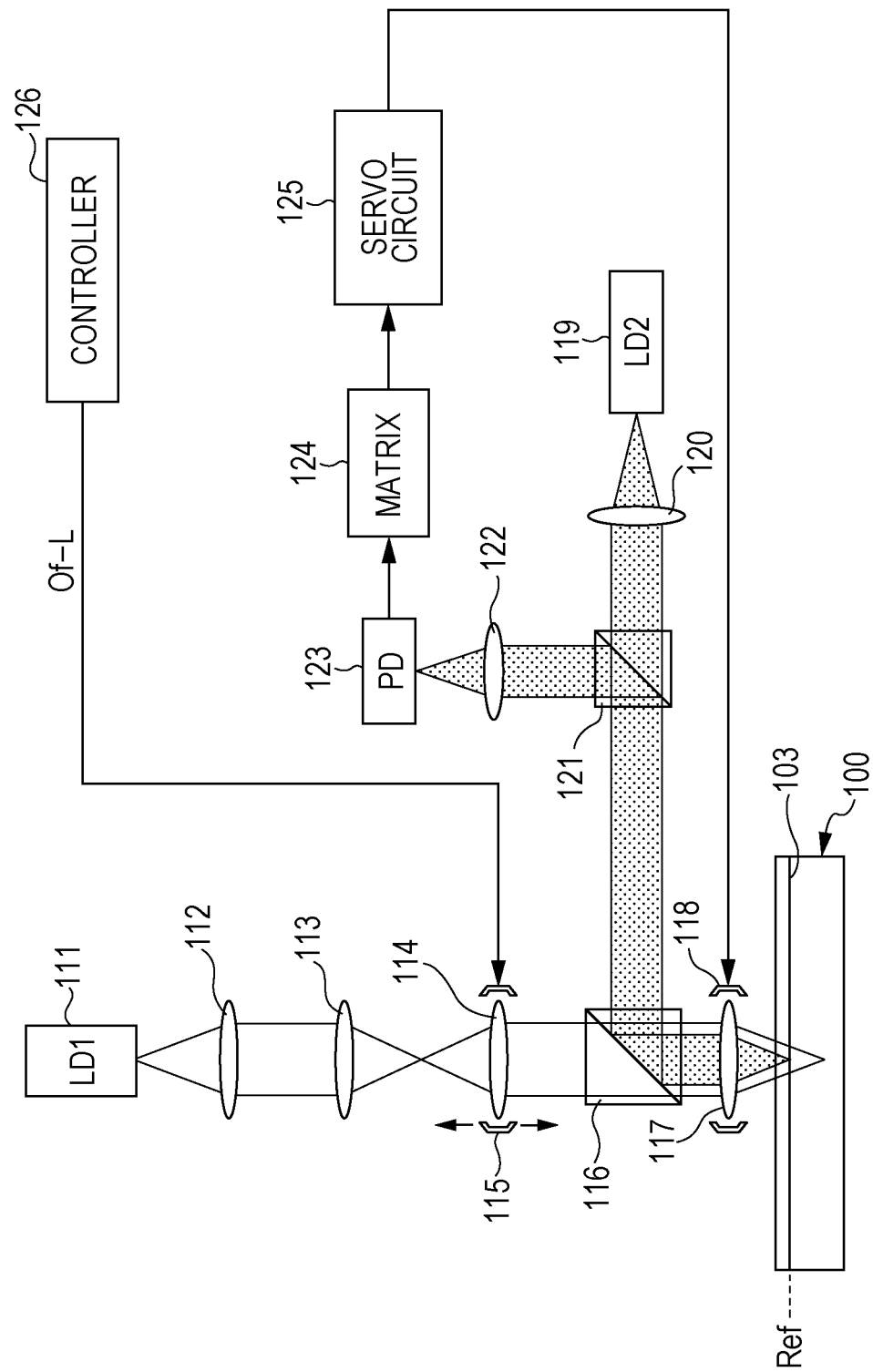
FIG. 22 is a diagram showing the internal configuration of a recording apparatus according to related art which performs recording on the bulk-type recording medium.

As also described above with reference to FIG. 21, in the bulk-type optical recording medium, in order to perform multi-layer recording on a bulk form recording layer, each layer position (information recording layer position L) on which information recording is to be performed is set in advance. In the bulk-type recording medium 1, as the information recording layer positions L, as in the case of FIG. 21, first, second, third, fourth, and fifth information recording layer positions L1, L2, L3, L4, and L5 which are respectively separated from the reference surface Ref at first, second, third, fourth, and fifth offsets of of-L1 of-L2, of-L3, of-L4, and of-L5 are set.

The information of the offset of-L at each layer position L from the reference surface Ref is set in advance by the recording apparatus side.

In addition, the number of information recording layer positions L is not limited to 5.

1-2. Internal Configuration of Recording Apparatus According to Embodiment

Figure 2:
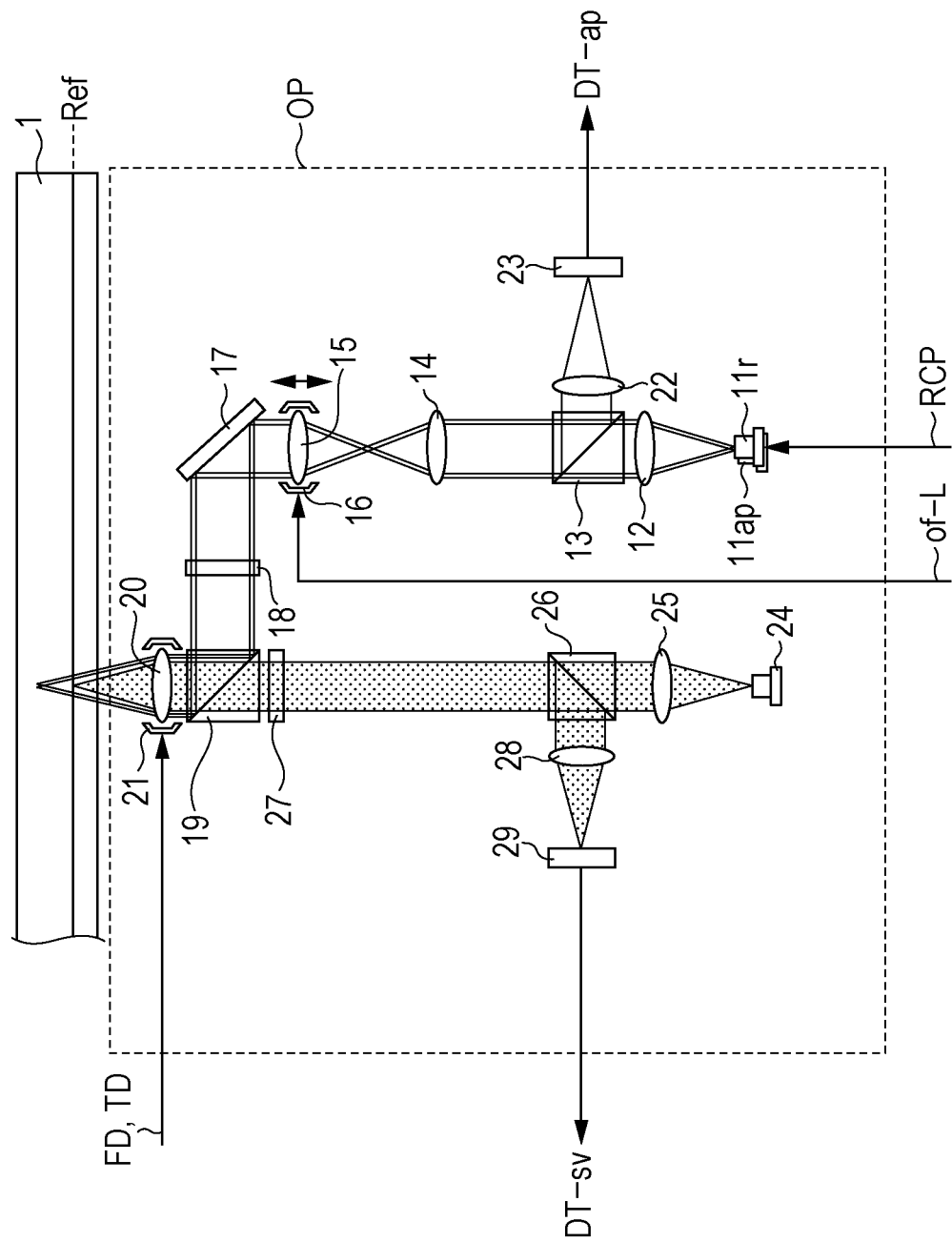
FIG. 2 is a diagram mainly illustrating the configuration of an optical system included in a recording apparatus according to the embodiment.

FIG. 2 is a diagram mainly illustrating the configuration of an optical system included in the recording apparatus as the embodiment which performs recording on the bulk-type recording medium 1 illustrated in FIG. 1. Specifically, the internal configuration of an optical pickup OP included in the recording apparatus is mainly shown.

In FIG. 2, the bulk-type recording medium 1 loaded in the recording apparatus is set so that its center hole is clamped at a predetermined position in the recording apparatus, and is held in a state capable of being rotated by a spindle motor (not shown).

The optical pickup OP is provided to illuminate the bulk-type recording medium 1 which is rotated by the spindle motor with the laser light for recording, the laser light for servo, and ATS light (ATS: Adjacent Track Servo) for forming a spot Sats for adjacent track servo.

Here, the adjacent track servo (ATS) performed using the ATS light will be described with reference to FIG. 3.

The ATS was originally considered as a self-servo track writer (SSTW) in a hard disk drive.

Figure 3:
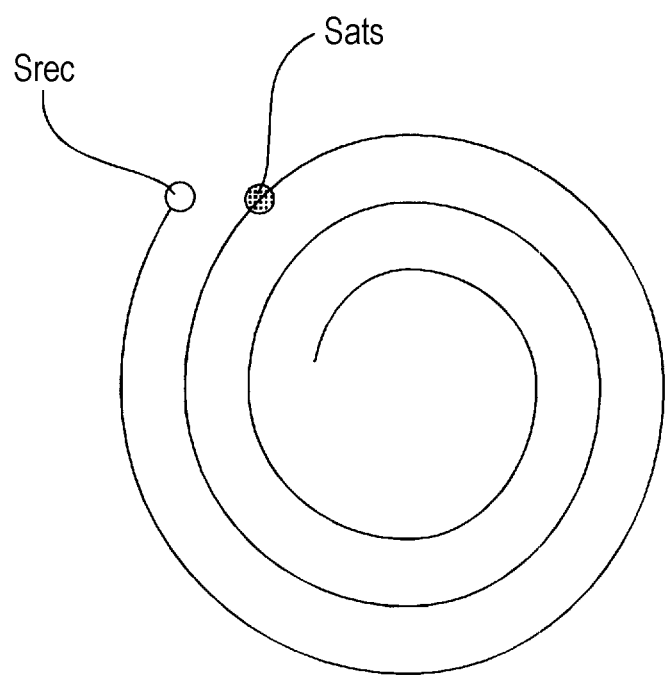
FIG. 3 is an explanatory view of ATS.

As illustrated in FIG. 3, during ATS, a spot Srec for recording (an illumination spot of the laser light for recording) and the spot Sats for adjacent track servo (an illumination spot of the ATS light) are formed on a recording medium.

During ATS, the spot Srec for recording is a preceding spot (that is, in a case where the recording progress direction in the radial direction is from the inner periphery to the outer periphery, the outer peripheral side), the spot Sats for adjacent track servo is a succeeding spot, a mark row formed at the spot Srec for recording is an object, and tracking servo is applied by the spot Sats for adjacent track servo. Consequently, the tracking servo control of the objective lens 20 is performed so that the spot Sats for adjacent track servo follows a track formed one track before by the spot Srec for recording.

According to such ATS, a track pitch is constant at a distance between the spots S, so that a problem in which tracks are overlapped by an influence such as eccentricity (information recording positions are overlapped) does not occur.

The description returns to FIG. 2.

In the optical pickup OP, a laser 11r for recording which becomes a light source of a laser light for performing signal recording by marks, and a laser 24 for servo which is a light source of a laser light for servo as light for performing position control using the position guiding elements formed on the reference surface Ref are provided. Moreover, a laser 11ap for use during ATS and reproduction is provided which is a light source for emitting a laser light for emitting ATS light during recording and for performing reading of a recording signal during reproduction.

In addition, as understood from the above description, in this embodiment, the ATS light is also used as light for reproducing signals recorded by marks.

Here, as mentioned above, as the laser light for recording and the laser light for servo, laser lights having different wavelength bands are used. In this example, it is assumed that the wavelength of the laser light for recording is about 405 nm (so-called blue-violet laser light), and the wavelength of the laser light for servo is about 650 nm (red laser light).

In addition, the laser light of which the light source is the laser 11ap for use during ATS and reproduction (hereinafter, simply referred to as ATS light) which has to function as the ATS light or reproduction light for signal reading has to transmit the selective reflection film 3 and reach the bulk layer 5, and since recording and reproduction wavelengths have to be the same, the laser light has the same wavelength as that of the laser light for recording.

In the optical pickup OP, the objective lens 20 is provided which becomes a common output of the laser light for recording, the laser light for servo, and the ATS light to the bulk-type recording medium 1.

Moreover, a first light sensing unit 23 for sensing the reflected light of the ATS light from the bulk-type recording medium 1, and a second light sensing unit 29 for sensing the reflected light of the laser light for servo from the bulk-type recording medium 1.

Furthermore, in the optical pickup OP, an optical system is formed for guiding the laser light for recording emitted by the laser 11r for recording and the ATS light emitted by the laser 11ap for use during ATS and reproduction to the objective lens 20, and for guiding the reflected light of the ATS light from the bulk-type recording medium 1, which is incident on the objective lens 20, to the first light sensing unit 23.

Specifically, the laser light for recording which is emitted from the laser 11r for recording and the ATS light emitted from the laser 11ap for use during ATS and reproduction become parallel light together via a collimation lens 12 and are incident on a polarizing beam splitter 13. The polarizing beam splitter 13 is configured to transmit the laser light for recording and the ATS light incident from the light source sides.

The laser light for recording and the ATS light transmitting the polarizing beam splitter 13 is incident on an expander constituted by a fixed lens 14, a movable lens 15, and a lens driving unit 16. In the expander, a side close to the light source is the fixed lens 14, the movable lens 15 is disposed on a side far from the light source, and as the movable lens 15 is driven in a direction parallel to the optical axis of the incident light by the lens driving unit 16, independent focus control is performed on the laser light for recording and the ATS light. The expander corresponds to the focus mechanism for recording light described above.

As also described later, in the focus mechanism for recording light, the lens driving unit 16 is driven according to the value of an offset of-L set to correspond to the information recording layer position L which is a recording object by a controller 44 illustrated in FIG. 3.

Each of the laser lights travelling via the fixed lens 14 and the movable lens 15 included in the focus mechanism for recording light is reflected by a mirror 17 as illustrated and is then incident on a dichroic prism 19 via a quarter-wave plate 18.

A selective reflection surface of the dichroic prism 19 is configured to reflect light having the same wavelength band as that of the laser light for recording and the ATS light and transmit light having different wavelengths. Therefore, each of the laser lights incident as described above is reflected by the dichroic prism 19.

Each of the laser lights reflected by the dichroic prism 19 illuminates the bulk-type recording medium 1 via the objective lens 20 as illustrated.

Here, as the laser light for recording and the ATS light illuminate via the objective lens 20 as such, the spot Srec for recording and the spot Sats for adjacent track servo as illustrated in FIG. 3 are formed at the information recording layer position L which is an object in the bulk layer 5.

The optical system in this case is designed so that a positional relationship between the spot Srec for recording and the spot Sats for adjacent track servo is fixed to a positional relationship set in advance.

In this example, a distance between the spot Srec for recording and the spot Sats for adjacent track servo in the radial direction is the same as the track pitch formed on the reference surface Ref (spiral pitch).

For the objective lens 20, a biaxial actuator 21 is provided which holds the objective lens 20 to be displaced in a focus direction (a direction to approach and be distant from the bulk-type recording medium 1) and in a tracking direction (a direction orthogonal to the focus direction: a direction parallel to the radial direction of the bulk-type recording medium 1).

The biaxial actuator 21 in this case is provided with a focus coil and a tracking coil and displaces the objective lens 20 in the focus direction and the tracking direction as driving signals (driving signals FD and TD described later) are given to the coils.

Here, during recording or reproduction, as the ATS light illuminates the bulk-type recording medium 1 as described above, the reflected light of the ATS light from mark rows in the bulk layer 5 is obtained.

The reflected light of the ATS light obtained as such is guided to the dichroic prism 19 via the objective lens 20 and is reflected by the dichroic prism 19.

The reflected light of the ATS light reflected by the dichroic prism 19 is incident to the polarizing beam splitter 13 via the quarter-wave plate 18, the mirror 17, and the focus mechanism for recording light (the movable lens 15 and the fixed lens 14).

Here, the reflected light (return path light) of the ATS light incident on the polarizing beam splitter 13 becomes different from the light (forward path light) incident on the polarizing beam splitter 13 from the laser hap for use during ATS and reproduction side in the polarizing direction by 90 degrees due to the operation of the quarter-wave plate 18 and the operation during reflection at the bulk-type recording medium 1. As a result, the reflected light of the ATS light incident as such is reflected by the polarizing beam splitter 13.

The reflected light of the ATS light reflected by the polarizing beam splitter 13 is condensed on the light sensing surface of the first light sensing unit 23 via a condenser lens 22.

Here, although description by illumination is omitted, the first light sensing unit 23 includes a plurality of (in this case, 4) light sensing elements. Hereinafter, light sensing signals obtained by the plurality of light sensing elements as the first light sensing unit 23 are collectively denoted by a light sensing signal DT-ap.

In the optical pickup OP, in addition to the configuration of the optical system for the laser light for recording and the ATS light described above, an optical system is formed for guiding the laser light for servo emitted from the laser 24 for servo to the objective lens 20 and for guiding the reflected light of the laser light for servo from the bulk-type recording medium 1, which is incident on the objective lens 20, to the second light sensing unit 29.

As illustrated, the laser light for servo emitted from the laser 24 for servo becomes parallel light via a collimation lens 25 and is then incident on the polarizing beam splitter 26. The polarizing beam splitter 26 is configured to transmit the laser light for servo (forward path light) incident from the laser 24 for servo side.

The laser light for servo transmitting the polarizing beam splitter 26 is incident on the dichroic prism 19 via the quarter-wave plate 27.

As described above, since the dichroic prism 19 is configured to reflect light having the same wavelength band as that of the laser light for recording and the ATS light and transmit light having other wavelengths, the laser light for servo is transmitted through the dichroic prism 19 and is incident on the bulk-type recording medium 1 via the objective lens 20.

In addition, the reflected light of the laser light for servo (the reflected light from the reference surface Ref) which is obtained as the laser light for servo illuminating the bulk-type recording medium 1 is transmitted through the dichroic prism 19 via the objective lens 20 and is then incident on the polarizing beam splitter 26 via the quarter-wave plate 27.

As in the case of the ATS light, the reflected light (return path light) of the laser for servo which is incident from the bulk-type recording medium 1 side becomes different from the forward path light in the polarizing direction by 90 degrees due to the operation of the quarter-wave plate 27 and the operation during reflection at the bulk-type recording medium 1. Therefore, the reflected light of the laser light for servo as the return path light is reflected by the polarizing beam splitter 26.

The reflected light of the laser light for servo reflected by the polarizing beam splitter 26 is condensed on the light sensing surface of the second light sensing unit 29 via a condenser lens 28.

The second light sensing unit 29 also includes a plurality of (for example, 4) light sensing elements, and hereinafter, light sensing signals obtained by the plurality of light sensing elements as the second light sensing unit 29 are collectively denoted by a light sensing signal DT-sv.

Here, although not shown in the figure, in practice, the recording apparatus is provided with a slide driving unit for driving the entire optical pickup OP described above to slide in the tracking direction, and by driving the optical pickup OP using the slide driving unit, an illumination position of the laser light can be displaced in a wide range.

Figure 4:
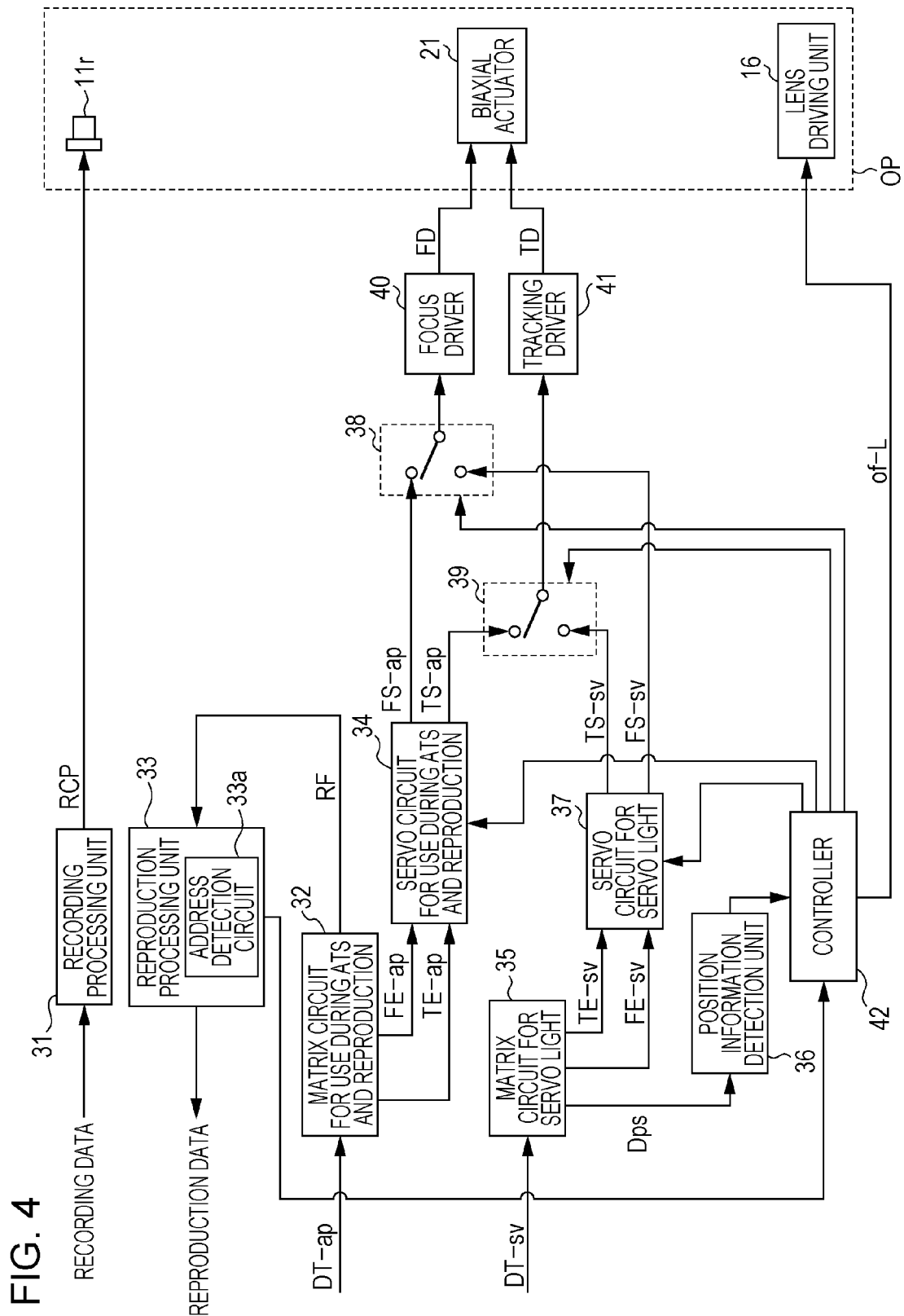
FIG. 4 is a diagram illustrating the internal configuration of the entire recording apparatus according to the embodiment.

FIG. 4 illustrates the internal configuration of the entire recording apparatus according to the embodiment.

In addition, in FIG. 4, only the laser 11r for recording, the lens driving unit 16, and the biaxial actuator 21 are extracted from the configuration illustrated in FIG. 2 to be illustrated in the internal configuration of the optical pickup OP.

In FIG. 4, in the recording apparatus, as a signal processing system related to the laser light for recording and the ATS light, a recording processing unit 31, a matrix circuit 32 for use during ATS and reproduction, a reproduction processing unit 33, and a servo circuit 34 for use during ATS and reproduction are provided.

Data to be recorded on the bulk-type recording medium 1 (recording data) is input to the recording processing unit 31. The recording processing unit 31 performs addition of an error-correcting code to the input recording data, predetermined recording modulation encoding, addition of address information, and the like, thereby obtaining a recording modulation data row which is a binary data row of, for example, "0" and "1" to be actually recorded on the bulk-type recording medium 1.

In addition, by a recording pulse signal RCP generated on the basis of the recording modulation data row, the data 11r for recording in the optical pickup OP is driven to emit light.

A light sensing signal DT-ap is input from the above-mentioned first light sensing unit 23 to the matrix circuit 32 for use during ATS and reproduction.

The matrix circuit 32 for use during ATS and reproduction generates various signals to be used in a matrix calculation process on the basis of the light sensing signal DT-ap.

Here, in this example, during reproduction of the signal recorded on the bulk layer 5 by the mark rows, the ATS light is used as the laser light for reproduction. In addition, during ATS and during reproduction, focus servo control and tracking servo control of the already-recorded mark row as an object are performed on the basis of the reflected light of the ATS light.

For this, the matrix circuit 32 for use during ATS and reproduction is configured to generate, on the basis of the light sensing signal DT-ap, a high-frequency signal corresponding to a reproduction signal of the above-mentioned recording modulation data row (a sum signal: hereinafter, referred to as a reproduction signal RF), a focus error signal FE-ap for the focus servo control (a signal representing a focus error for the mark row), and a tracking error signal TE-ap for the tracking servo control (a signal representing a positional error in the radial direction of the already-recorded mark row at the spot Sats for adjacent track servo).

The reproduction signal RF generated by the matrix circuit 32 generated for use during ATS and reproduction is supplied to the reproduction processing unit 33.

In addition, the focus error signal FE-ap and the tracking error signal TE-ap are supplied to the servo circuit 34 for use during ATS and reproduction.

The reproduction processing unit 33 performs a reproduction process for restoring the recording data, such as a binarization process, decoding of the recording modulation signal, or an error correction process, thereby obtaining reproduction data reproduced from the recording data.

In addition, the reproduction processing unit 33 includes an address detection circuit 33a for detecting address information embedded into the data recorded by the mark rows on the basis of the reproduction signal RF.

The address information detected by the address detection circuit 33a is supplied to a controller 42 described later.

The servo circuit 34 for use during ATS and reproduction generates a focus servo signal FS-ap and a tracking servo signal TS-ap respectively on the basis of the focus error signal FE-ap and the tracking error signal TE-ap in response to an instruction from the controller 42. Here, the focus servo signal FS-ap becomes a signal for causing the focal position of the ATS light to follow the information recording layer position (mark formation layer position) Ln which is a reproduction object (canceling a focus error). In addition, the tracking servo signal TS-ap becomes a signal for causing the spot position of the ATS light to follow the mark row (cancelling a tracking error).

The focus servo signal FS-ap and the tracking error signal TS-ap are used during ATS and reproduction.

In addition, the servo circuit 34 for ATS and reproduction also performs execution control of a track jump operation for causing the illumination spot of the ATS light to jump to another mark row by turning off the tracking servo, in response to the instruction from the controller 42.

The focus servo signal FS-ap generated by the servo circuit 34 for use during ATS and reproduction is supplied to a selector 38, and the tracking error signal TS-ap is supplied to a selector 39.

In addition, in the recording apparatus, as a signal processing system related to the reflected light of the laser light for servo, a matrix circuit 35 for servo light, a position information detection unit 36, and a servo circuit 37 for servo light are provided.

The matrix circuit 35 for servo light generates necessary signals on the basis of the light sensing signal DT-sv from the plurality of light sensing elements in the second light sensing unit 29 illustrated in FIG. 2.

Specifically, the matrix circuit 35 for servo light generates, on the basis of the light sensing signal DT-sv, a tracking error signal TE-sv representing a positional error in the radial direction of the illumination spot position of the laser light for servo with respect to the guiding grooves (tracks) formed on the reference surface Ref.

In addition, the matrix circuit 35 for servo light generates, as a signal for performing focus servo control during recording, a focus error signal FE-sv representing a focus error of the laser light for servo with respect to the reference surface Ref (the selective reflection film 3).

In addition, the matrix circuit 35 for servo light generates a signal Dps for position information detection as a signal for detecting position information recorded on the reference surface Ref. As the signal Dps for position information detection, a sum signal is generated in a case where the guiding grooves are formed as a pit row, and a push-pull signal is generated in the case where the guiding grooves are formed as wobbling grooves.

The signal Dps for position information detection generated by the matrix circuit 35 for servo light is supplied to the position information detection unit 36. The position information detection unit 36 detects the position information (address information) recorded on the reference surface Ref on the basis of the signal Dps for position information detection. The detected address information is supplied to the controller 42.

In addition, the focus error signal FE-sv and the tracking error signal TE-sv generated by the matrix circuit 35 for servo light are supplied to the servo circuit 37 for servo light.

The servo circuit 37 for servo light generates a focus servo signal FS-sv (a signal for causing the focal position of the laser light for servo to follow the reference surface Ref) on the basis of the focus error signal FE-sv, and generates a tracking servo signal TS-sv (a signal for causing the spot position of the laser light for servo to follow the position guiding elements on the reference surface Ref) on the basis of the tracking error signal TE-sv, in response to the instruction from the controller 42.

In addition, the matrix circuit 35 for servo also performs execution control of a track jump operation for causing the illumination spot of the laser light for servo to jump to another track by turning off the tracking servo, in response to the instruction from the controller 42.

The focus servo signal FS-sv generated by the servo circuit 37 for servo light is supplied to the selector 38, and the tracking servo signal TS-sv is supplied to the selector 39.

Here, the selector 38 selectively outputs any one of the focus servo signal FS-ap and the focus servo signal FS-sv in response to the instruction from the controller 42.

In addition, the selector 39 selectively outputs any one of the tracking servo signal TS-ap and the tracking servo signal TS-sv in response to the instruction from the controller 42.

The focus servo signal FS selected by the selector 38 is supplied to a focus driver 40.

The focus driver 40 drives the focus coil of the biaxial actuator 21 by a focus driving signal FD generated on the basis of the supplied focus servo signal FS. Accordingly, the objective lens 20 is driven to cause the focal position of the laser light for servo to follow the reference surface Ref or to cause the focal position of the ATS light to follow the information recording layer position Ln which is a recording object.

In addition, the selector 39 selectively any outputs one of the tracking servo signal TS-ap and the tracking servo signal TS-sv in response to the instruction from the controller 42.

The tracking servo signal TS selected by the selector 39 is supplied to a tracking driver 41, and the tracking driver 41 drives the tracking coil of the biaxial actuator 21 by a tracking driving signal TD generated on the basis of the supplied tracking servo signal TS.

Accordingly, the objective lens 20 is driven to cause the illumination spot of the laser light for servo to follow the tracks on the reference surface Ref or to cause the spot position of the ATS light to follow the mark row.

The controller 42 is configured as, for example, a CPU (Central Processing Unit) or a microcomputer having a memory (storage device) such as a ROM (Read Only Memory) or a RAM (Random Access Memory) and performs control processing according to programs stored in, for example, the ROM mentioned above, thereby controlling the entire recording apparatus.

For example, the controller 42 controls (sets) the focal position of the laser light for recording during recording (during initial recording of a first embodiment described later), on the basis of the value of the offset of-L set to correspond to each layer position L as described above. Specifically, the controller 42 drives the lens driving unit 16 in the optical pickup OP on the basis of the value of the offset of-L set to correspond to the information recording layer position Ln as a recording object, thereby selecting the recording position in the depth direction.

Moreover, the lens driving unit 16 may also be driven to adjust the focus position of the ATS light.

In addition, the controller 42 performs control so that the focus servo and the tracking servo in a method corresponding to each case of recording, reproduction, and access for the bulk-type recording medium 1 are made by instructing the servo circuit 34 for use during ATS and reproduction, the servo circuit 37 for servo light, the selector 38, and the selector 39, and this will be described later.

In addition, the controller 42 performs access control (control of movement to recording and reproduction positions) based on the address information (address information recorded by the mark row) from the address detection circuit 33a in the recording processing unit 33, and on the address information (address information recorded on the reference surface Ref) from the position information detection unit 36, and this will be described later again.

1-3. Recording Method as First Embodiment

Initial Recording

Here, in the recording apparatus of the first embodiment described above, in a state where no mark is formed on the bulk layer 5, when recording is performed on the information recording layer position Ln, servo control based on the reference surface Ref is performed. Specifically, while focus servo control and tracking servo control of the objective lens 20 is performed on the basis of the reflected light of the laser light for servo from the reference surface Ref, the laser light for recording is focused on the information recording layer position Ln by driving the lens driving unit 16.

In this case, it is natural that access to a recording start position is performed on the basis of the address information recorded on the reference surface Ref.

As can be seen in consideration of this point, even in the recording apparatus in this case, a deviation of the information recording position occurs due to a spot position deviation between the laser light for servo and the laser light for recording caused by the eccentricity as described above with reference to FIG. 23.

In addition, even during reproduction, access to a reproduction start position is performed on the basis of the address information of the reference surface Ref (that is, on the basis of the reflected light of the laser light for servo); however, regarding this point, even during access for the reproduction, a spot position deviation occurs between the laser light for servo and the laser light for reproduction (in this example, the ATS light) caused by eccentricity and the like, and consequently, a deviation occurs between an access position on the reference surface Ref and an access position in the actual bulk layer 5.

As understood from the above description of FIG. 24, in a case where a spot position deviation occurs during both recording and reproduction, when the head position of recording is a position before which a mark non-formation area exists (on the reverse side to the above-mentioned recording progress direction), such as the head position on a disc or the head position of a zone, there is a concern that a problem may occur in which the illumination spot of the laser light for reproduction is positioned in the mark non-formation portion during access for reproduction.

Figure 24A:
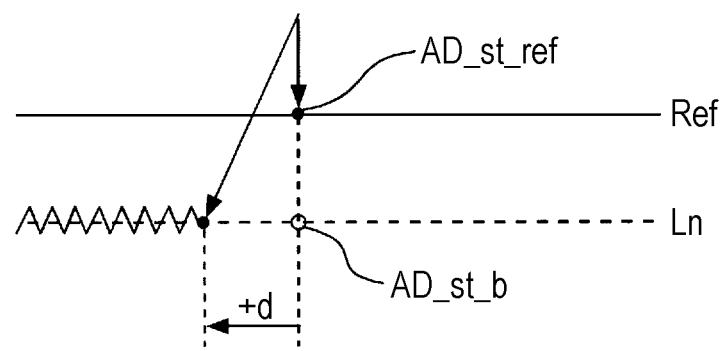
FIGS. 24A and 24B are diagrams illustrating a case where a relationship between a deviation from an actual reproduction start position caused by a spot position deviation during access for reproduction, and a spot position deviation that occurs during recording becomes the worst.
Figure 24B:
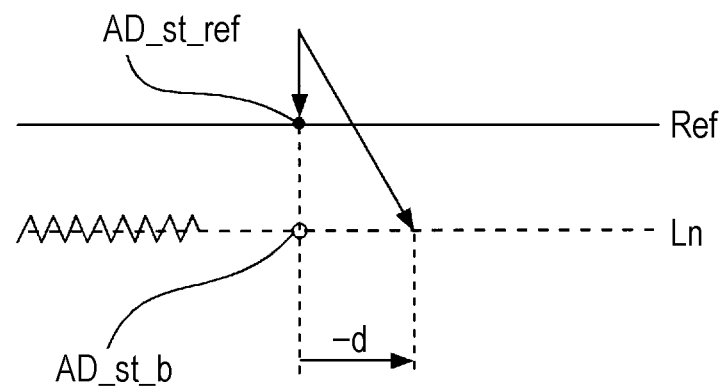

That is, when replacement of a disc is performed during reproduction after recording is performed, an eccentricity generation form is changed between recording and reproduction due to the replacement, and there is a concern that as illustrated in FIGS. 24A and 24B, a spot deviation direction during recording and a spot deviation direction during reproduction may reverse each other. In this case, the illumination spot of the laser light for reproduction during access for reproduction is positioned in the mark non-formation portion.

In the case where the illumination spot of the laser light for reproduction during access is positioned in the mark non-formation portion as such, pull-in of tracking servo by the laser light for reproduction to the mark row as an object may not be performed, and a retry process and the like of performing an access operation based on the reference surface Ref by the laser light for servo again have to be performed, and there is a problem in that an access time is significantly delayed.

Here, in this embodiment, in order to prevent the illumination position of the laser light for reproduction from being positioned in the mark non-formation portion during access (during switching of servo to the laser light for reproduction) for reproduction as such, a recording method as described as below is employed.

First, when the recording method of the embodiment is to be realized, the maximum amount (hereinafter, referred to as a maximum spot deviation amount D_max) of a spot position deviation amount that occurs between the laser light for servo and the laser light for recording is defined.

Figure 5:
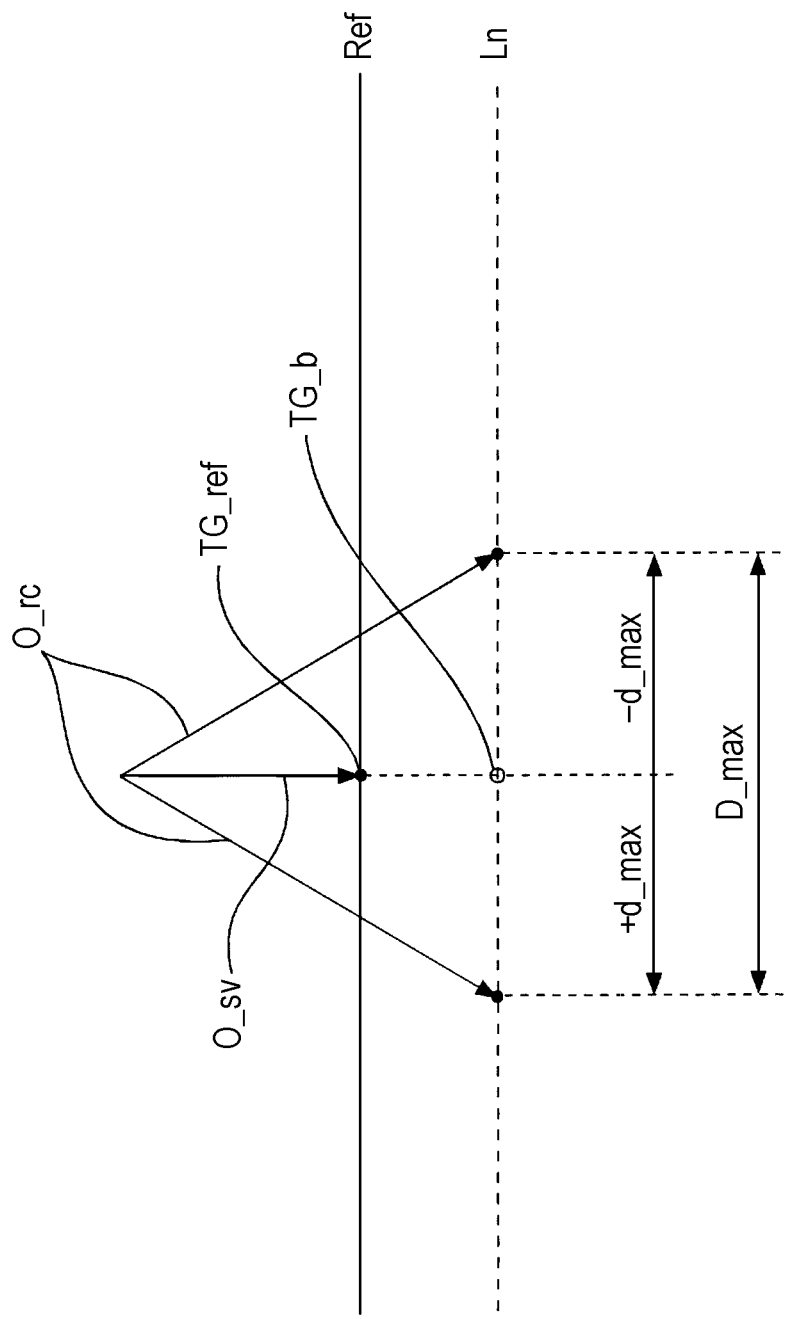
FIG. 5 is a diagram illustrating the maximum spot deviation amount.

FIG. 5 is a diagram illustrating the maximum spot deviation amount D_max.

Figure 6:
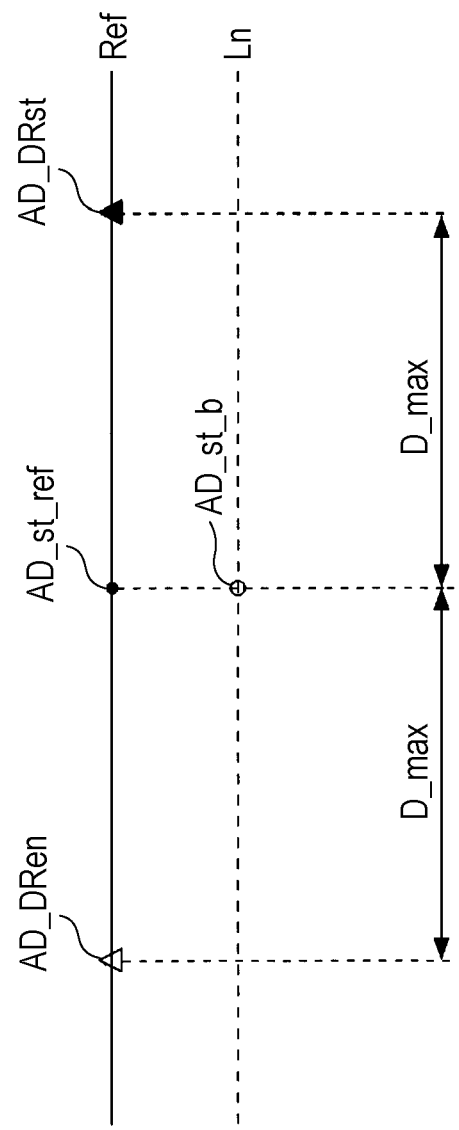
FIG. 6 is a diagram illustrating a dummy data recording start address and a dummy data recording end address.
Figure 7:
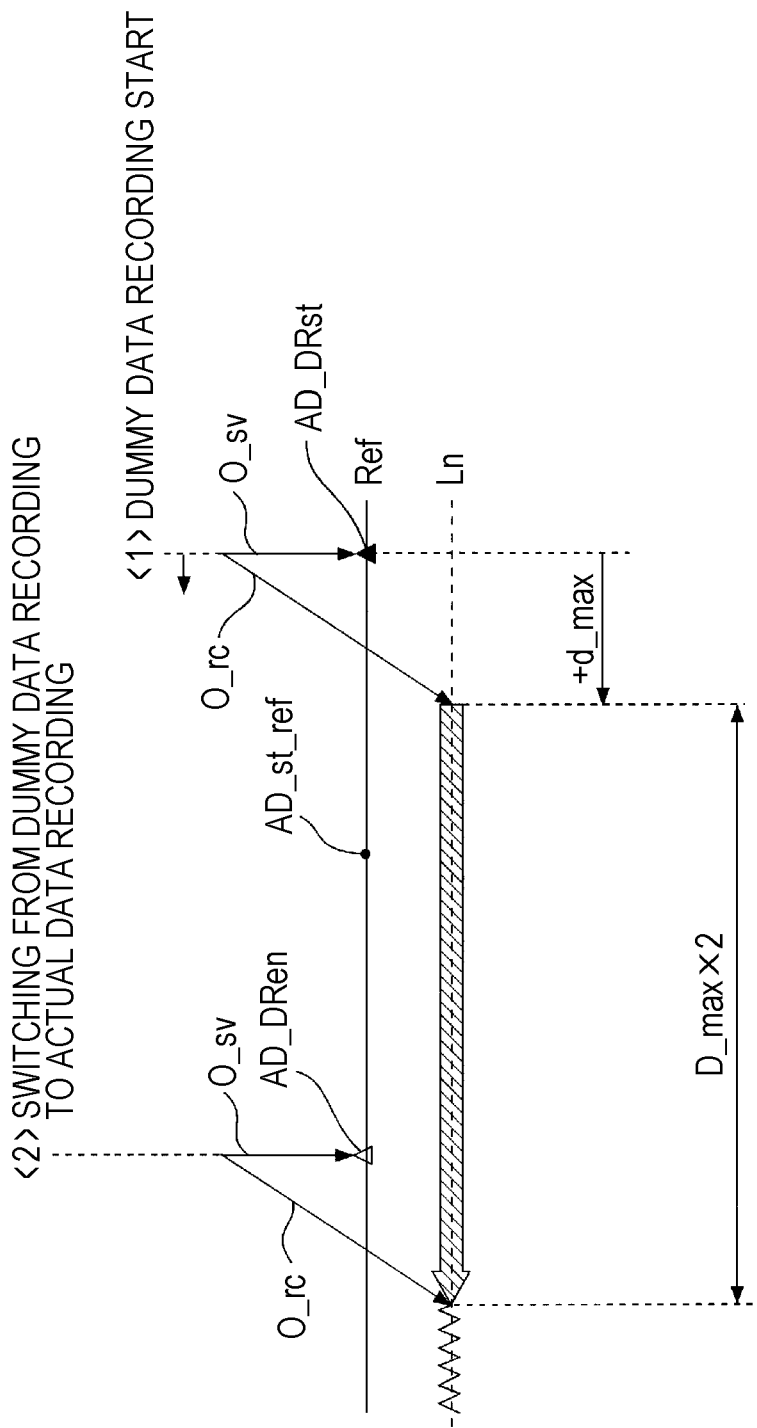
FIG. 7 is a diagram exemplifying a case where a spot position deviation occurs on a forward direction side during recording.
Figure 8:
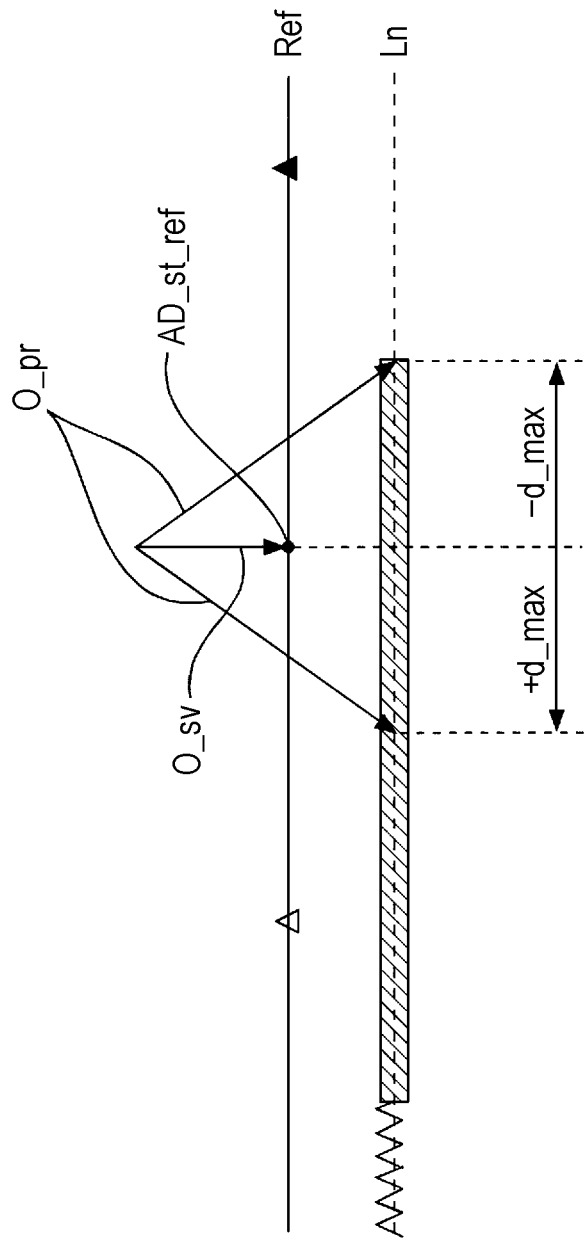
FIG. 8 is a diagram showing a form of actual data recorded in the state of FIG. 7 during reproduction.
Figure 9:
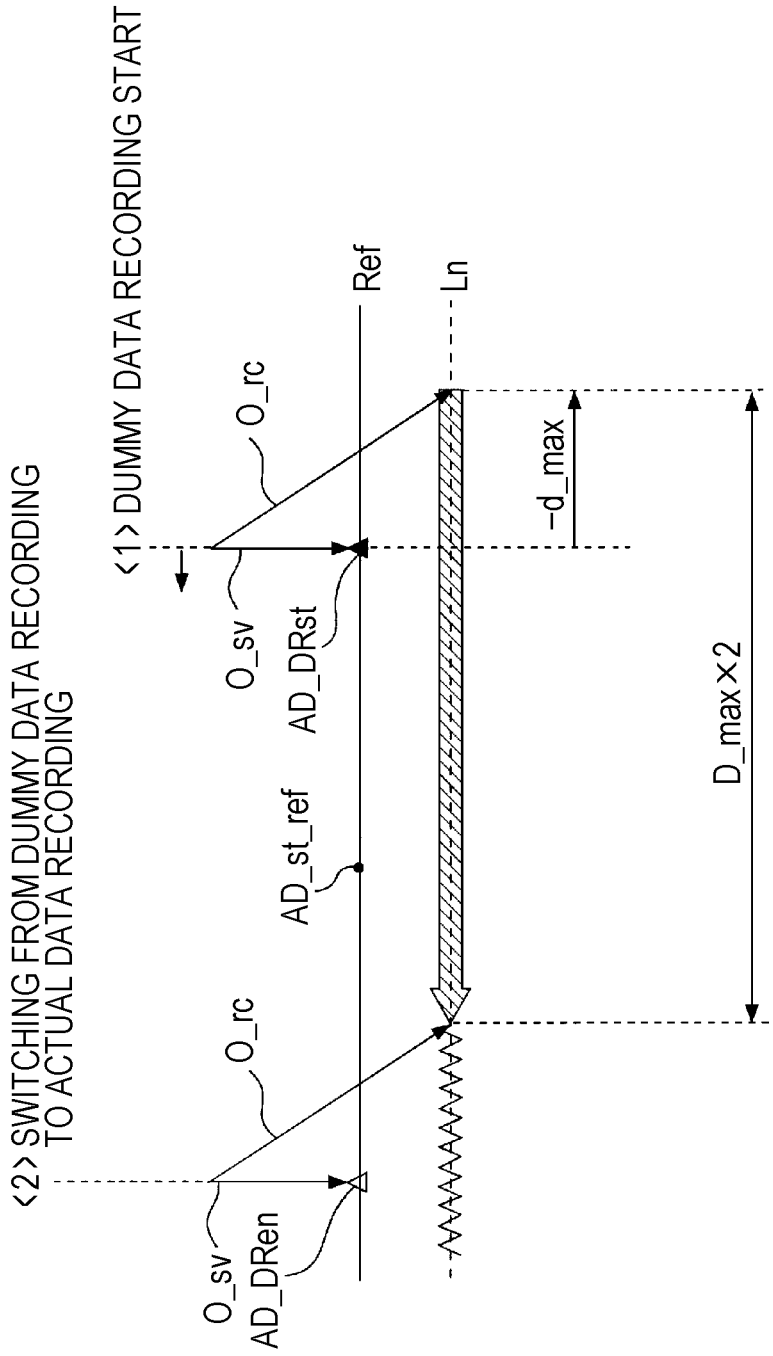
FIG. 9 is diagram exemplifying a case where a spot position deviation occurs on a reverse direction side during recording.
Figure 10:
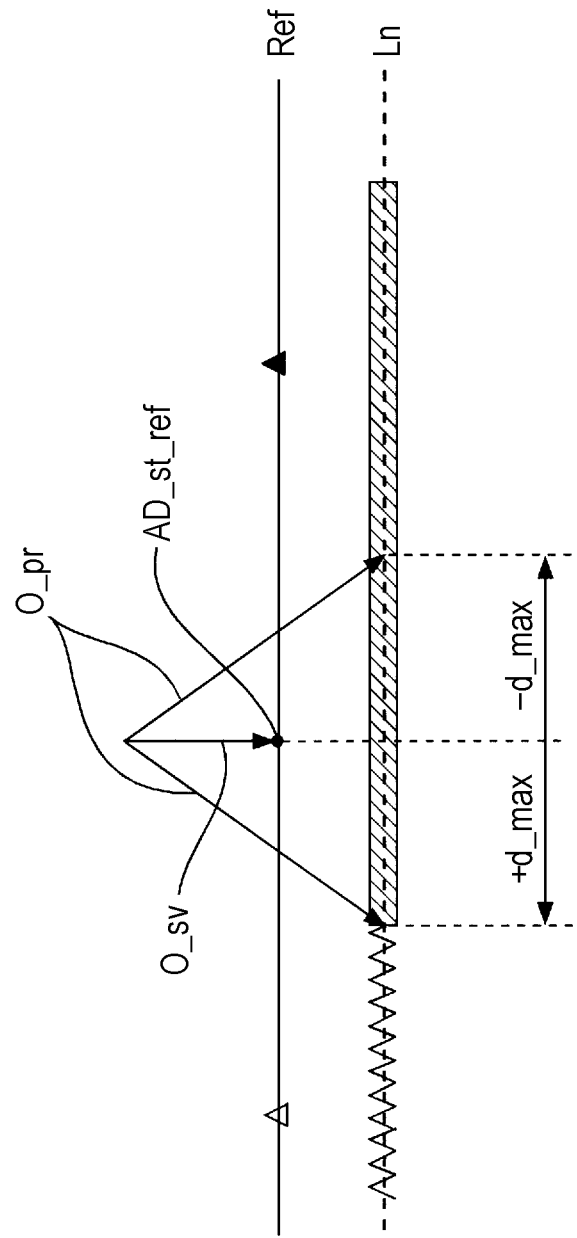
FIG. 10 is a diagram illustrating a form of the actual data recorded in the state of FIG. 9 during reproduction.

In addition, in FIGS. 6 to 10 described following FIG. 5 described at the start, a relationship between the reference surface Ref, the information recording layer position Ln as a recording object (the information recording layer position Ln as a reproduction object in FIGS. 8 and 10), the light beam O_sv of the laser light for servo, and the laser beam O_rc of the laser light for recording (the light beam O_rp of the laser light for reproduction in FIGS. 8 and 10) are shown.

First, in FIG. 5, "TG_ref" in the figure means a track on the reference surface Ref which becomes a servo object of the tracking servo control by the laser light for servo. In addition, "TG_b" means an illumination spot position of the laser light for recording in an ideal state where a spot position deviation does not occur while the tracking servo control by the laser light for servo is performed on the track TG_ref as an object.

As described above with reference to FIGS. 24A and 24B, there is a possibility that the spot position deviation to both forward and reverse direction sides (the outer peripheral side and the inner peripheral side) of the recording progress direction may occur according to the influence of eccentricity and the like. Here, it is assumed that a spot position deviation amount that occurs in the forward direction of the recording progress direction is +d and a spot position deviation amount that occurs in the reverse direction of the recording progress direction is −d. In addition, it is assumed that the maximum value of the spot position deviation amount +d is a forward direction side maximum spot deviation amount +d_max, and the maximum value of the spot position deviation amount −d is a reverse direction side maximum spot deviation amount −d_max.

As illustrated, the maximum spot deviation amount D_max is represented as:

$$D\_max=|+d\_max|+|-d\_max|.$$

Here, the influence of disc eccentricity or disc tilt which becomes a factor of the spot position deviation symmetrically occurs in both directions. Therefore, the maximum spot deviation amount D_max is represented as:

$$D\_max=|d\_max|\times 2.$$

As understood from the above description, the main factor of the spot position deviation is eccentricity or tilt. In addition, the original spot position deviation occurs as the laser light for recording is incident on the objective lens 20 as non-parallel light. In other words, the spot position deviation amount is determined according to the value of an optical magnification of the laser light for servo and the laser light for recording set in the optical system.

As understood from this point, the maximum spot deviation amount D_max is determined according to the configuration (design) of the optical system included in the recording apparatus, the standards of the disc (an eccentricity allowable amount or tilt allowable amount), and the like.

In addition, in this example, the minimum unit that can be selected in the radial direction is a track unit, so that the maximum spot deviation amount D_max is obtained in units of the number of tracks.

After the maximum spot deviation amount D_max is determined in advance as such, in this embodiment, a recording method using the maximum spot deviation amount D_max as described as below is employed.

That is, data instructed to be recorded is to be recorded from an instructed recording start address, recording is not simply started from the recording start address like the related art, but recording of dummy data is performed on an area adjacent to the front side at least from the recording start address over a range of equal to or greater than the maximum spot deviation amount D_max, and then the data instructed to be recorded is recorded in succession to the recording area of the dummy data.

Here, in this example, recording of the dummy data over the range of equal to or greater than the maximum spot deviation amount D_max is performed on the area adjacent to the front side from the recording start address and is also performed on an area after the recording start address.

For the realization of the recording method, first, as shown in FIG. 6, as the address information on the reference surface Ref, an address AD_DRst at which recording of the dummy data is to be started (hereinafter, denoted by a dummy data recording start address AD_DRst), and an address AD_DRen at which the recording of the dummy data is to be completed, in other words, an address immediately before an address at which data instructed to be recorded (hereinafter, referred to as actual data) is to be started (hereinafter, a dummy data recording end address AD_DRen) are obtained by calculations.

When the instructed recording start address is assumed to be AD_st_ref, the dummy data recording start address AD_DRst and the dummy data recording end address AD_DRen are calculated using the information about the address AD_st_ref and the maximum spot deviation amount D_max.

Specifically, in this example, since recording of the dummy data is performed on both the area on the front side from the recording start address AD_st_ref and the area after the recording start address AD_st_ref, the dummy data recording end address AD_DRen is expressed as a position deviated from the recording start address AD_st_ref to the rear side (the forward direction side of the recording progress direction) by the maximum spot deviation amount D_max or greater as illustrated.

Here, due to the simplified illustration, the dummy data recording start address AD_DRst is illustrated to be set to a position on the front side from the recording start address AD_st_ref by the maximum spot deviation amount D_max, and the dummy data recording end address AD_DRen is illustrated to be set to a position on the rear side from the instructed recording start address AD_st_ref by the maximum spot deviation amount D_max. However, this example is based on the premise that the ATS light is used as the laser light for reproduction. In other words, this example is based on the premise that the optical axis of the laser light for servo and the laser light for recording is not aligned with the optical axis of the laser light for reproduction, and the illumination spot position of the laser light for reproduction is positioned on the front side from the illumination spot position of the laser light for servo and the laser light for recording by 1 track. Therefore, the dummy data recording start address AD_DRst, strictly, is set to an address at a position on the front side at least from the instructed recording start address AD_st_ref by the "maximum spot deviation amount D_max+1 track" or greater.

In addition, the dummy data recording end address AD_DRen, strictly, has to be set to an address at a position on the rear side at least from the instructed recording start address AD_st_ref by "the maximum spot deviation amount D_max−1 track" or greater.

Moreover, as is apparent from the above description, even though the dummy data recording end address AD_DRen is simply set to the "address at a position on the rear side from the recording start address AD_st_ref by the maximum spot deviation amount D_max or greater, there is no difference in the effect. Regarding this point, in this example, the dummy data recording end address AD_DRen is set to "an address at a position on the rear side at least from the recording start address AD_st_ref by the maximum spot deviation amount D_max" or greater.

Here, in the following description, as an example, a case where the dummy data recording start address AD_DRst is set to an address at a position on the front side from the instructed recording start address AD_st_ref accurately by "the maximum spot deviation amount D_max+1 track" is exemplified.

In addition, a case where the dummy data recording end address AD_DRen is set to an address at a position on the rear side from the instructed recording start address AD_st_ref accurately by the maximum spot deviation amount D_max is exemplified.

After the dummy data recording start address AD_DRst and the dummy data recording end address AD_DRen are set, recording of the dummy data and recording of the actual data are performed in the order described in FIG. 7 as follows.

That is, first, as illustrated by <1> in FIG. 7, recording of the dummy data is performed from the dummy data recording start address AD_DRst. Specifically, a process for moving the illumination spot of the laser light for servo to the address AD_DRst on the basis of the address information of the reference surface Ref is performed, and recording of the dummy data by the laser light for recording is started in response to the completion of the movement (access of the address AD_DRst is completed: the address reaches AD_DRst).

Just for confirmation, the tracking servo control of the objective lens 20 during recording of the dummy data and during recording of the actual data is performed to cause the illumination spot of the laser light for servo to follow the tracks of the reference surface Ref (that is, the tracking servo control by the servo circuit 37 for servo light of FIG. 4 is performed).

Here, in FIG. 7, the case where as a spot position deviation during recording, the spot position deviation by the forward direction side maximum spot deviation amount+d_max occurs is exemplified, so that, as illustrated, recording of the dummy data is started from the position offset from the address AD_DRst by +d_max in practice.

After starting recording by <1>, in <2> in FIG. 7, switching from the recording of the dummy data to the recording of the actual data is performed in response to that the recording of the dummy data to the dummy data recording end address AD_DRen is completed.

According to the form of the spot position deviation in this case, the recording of the dummy data is performed to the position offset from the address AD_DRen by +d_max in practice.

As a result of the operation described above, the dummy data is recorded at least over a section length of two times the maximum spot deviation amount D_max.

FIG. 8 is a diagram showing a form of the actual data recorded as described above during reproduction.

During reproduction, as a reproduction start address, the address AD_st_ref on the reference surface Ref is instructed as the reproduction start address, and the recording apparatus in response to this performs an access operation using the reproduction start address AD_st_ref as a target address.

In addition, as access to the reproduction start address AD_st_ref is completed, the tracking servo control of the objective lens 20 is switched from the tracking servo control by the laser light for servo to the tracking servo by the laser light for reproduction (in this case, the ATS light) so as to perform pull-in of the tracking servo on the mark row as an object by the laser light for reproduction.

When pull-in of the tracking servo to the mark row has succeeded, referring to the address information recorded by the mark row, the tracking servo is moved to an actual data recording start address in practice.

In addition, as understood from the above description, during reproduction, as the focus servo control of the objective lens 20, the focus servo control based on the reflected light of the laser light for reproduction is performed.

As described above, during the reproduction there may be cases where forms of the spot position deviations become different when the disc is replaced between the reproduction and the recording. Therefore, during reproduction, there may be cases where, as the spot position deviation, a spot position deviation over the range from the reverse direction side maximum spot position deviation amount−d_max to the forward direction side maximum spot deviation amount+d_max occurs.

Here, the recording start position of the dummy data in FIG. 7 in practice becomes a position offset from the dummy data recording start address AD_DRst by the forward direction side maximum spot deviation amount+d_max.

As understood from the above description, since the dummy data recording start address AD_DRst is set to the position on the front side by the maximum spot deviation amount D_max (in this example, on the front side by D_max+1 track) from the instructed recording start address (reproduction start address) AD_st_ref, even though a spot position deviation by the forward direction side maximum spot deviation amount+d_max as in FIG. 7 occurs during recording, it is guaranteed that the actual recording start position of the dummy data is reliably a position on the front side of the position offset from the recording start (reproduction start) address AD_st_ref by the reverse direction side maximum spot deviation amount−d_max.

From this, even though a spot position deviation occurs due to the reverse direction side maximum spot deviation amount−d_max during reproduction, the illumination spot of the laser light for reproduction at this time is reliably in the recording area of the dummy data (mark formation area). That is, during access for reproduction (during servo switching), the illumination spot of the laser light for reproduction is prevented from being positioned in a mark non-formation portion.

As described above, when the recording of the dummy data of the maximum spot deviation amount D_max or greater is performed on the area adjacent to the front side from the recording start address AD_st_ref, during access for reproduction (during servo switching), the illumination spot of the laser light for reproduction is prevented from being positioned in the mark non-formation portion.

In addition, as apparent from FIG. 8, during reproduction, when the spot position deviation is a deviation to the forward direction side, the illumination spot of the laser light for reproduction is reliably positioned in the mark formation area.

In addition, FIG. 9 illustrates a case where as the spot position deviation during recording, the spot position deviation by the reverse direction side maximum spot deviation amount−d_max occurs, and FIG. 10 illustrates a form of the actual data recorded in the state of FIG. 9 during reproduction.

As illustrated in FIG. 9, in the case where the spot position deviation by the reverse direction side maximum spot deviation amount−d_max occurs during recording, when recording is performed by the method described above in this example, the recording of the dummy data is performed on a section at least over a section length of two times the maximum spot deviation amount D_max from the position offset from the address AD_DRst by −d_max to the position offset from the address AD_DRen by −d_max in practice.

Referring to FIG. 10, it can be seen that even in the case where the recording is performed in the state as illustrated in FIG. 9, when the spot position deviation by the reverse direction side maximum spot deviation amount−d_max or the spot position deviation by the forward direction side maximum spot deviation amount+d_max occurs during reproduction, it is guaranteed that the illumination spot of the laser light for reproduction is reliably in the mark formation area.

Particularly in this case, it should be noted that when the spot position deviation to the forward direction side occurs during reproduction, it is guaranteed that the illumination spot of the laser light for reproduction is reliably in the recording area of the dummy data (in front of the recording start position of the actual data). This effect is exhibited on the basis that the recording of the dummy data of the maximum spot deviation amount D_max or greater is also performed on the area side after the recording start address AD_st_ref.

As understood from this, according to the recording method of this example in which the recording of the dummy data of the maximum spot deviation amount D_max or greater is also performed on the area after the recording start address AD_st_ref, regardless of the form of the spot deviation during recording and reproduction, it can be guaranteed that the illumination spot of the laser light for reproduction is reliably positioned on the front side from the recording start position of the actual data.

When it is guaranteed that the illumination spot of the laser light for reproduction is reliably positioned on the front side from the recording start position of the actual data as such, the illumination spot of the laser light for reproduction may not be caused to jump to the front side during access for reproduction and therefore a more smooth access operation can be realized.

According to the recording method as the first embodiment as described above, it can be guaranteed that the illumination spot of the laser light for reproduction is reliably positioned in the mark formation area during access for reproduction.

Accordingly, a significant delay of an access time to the disc head (zone head) during reproduction which occurs in the related art can be prevented. In addition, in the point that the illumination spot of the laser light for reproduction may be reliably positioned on the front side from the recording start position of the actual data, the effect in which a more smooth access operation is realized is exhibited.

Moreover, in this example, the ATS light is used as the laser light for reproduction. However, in a case where the laser 11r for recording can emit light at a reproduction power, a laser light at the reproduction power by the laser 11r for recording may be used as the laser light for reproduction.

In this case, the optical axes of the laser light for recording and the laser light for reproduction are aligned with each other, so that the dummy data recording start address AD_DRst may be set to a position on the front side at least from the instructed recording start address AD_st_ref by the maximum spot deviation amount D_max or greater.

In consideration of the case where the laser light for reproduction of which the optical axis is aligned with that of the laser light for recording is used, it is found that the recording of the dummy data may be performed at least over the range of the maximum spot deviation amount D_max or greater on the front side from the recording start address AD_st_ref.

In addition, with regard to the rear side from the recording start address AD_st_ref, when the recording of the dummy data is performed over the range of the maximum spot deviation amount D_max or greater, it can be guaranteed that the illumination spot of the laser light for reproduction is reliably positioned on the front side from the actual data.

Additional Writing Operation

However, after initial recording is performed by the above-described method, when additional writing is performed on the succeeding portion, there is a possibility that the disc may be replaced between the initial recording and the additional writing, and there may be a case where the form of disc eccentricity may be changed. That is, during the additional writing, there is a concern that the spot deviation direction may become the reverse direction to that of the initial recording.

As understood from this, during additional writing, if recording is performed while applying the tracking servo by the laser light for servo like the initial recording, intersecting or overlapping of the initially recorded portion and the additionally written portion may occur. As a result, there is a concern that a recording signal for the boundary between the initially recorded portion and the additionally written portion may not be appropriately reproduced.

In this embodiment, during the additional writing after the initial recording, recording by ATS is performed. Specifically, recording by the laser light for recording is performed while applying servo to the already recorded mark row by the ATS light.

In addition, when additional writing by the ATS is performed, servo pull-in of the ATS has to be reliably performed by reliably accessing the recording end portion of the already written section.

That is, as understood from the above description, during the additional writing, there may be a case where the spot position deviation direction is different from that of previous recording, so that there is a possibility that simply accessing an instructed additional writing start address on the reference surface Ref may impair smooth servo switching from the laser light for servo to the ATS light.

Figure 11A:
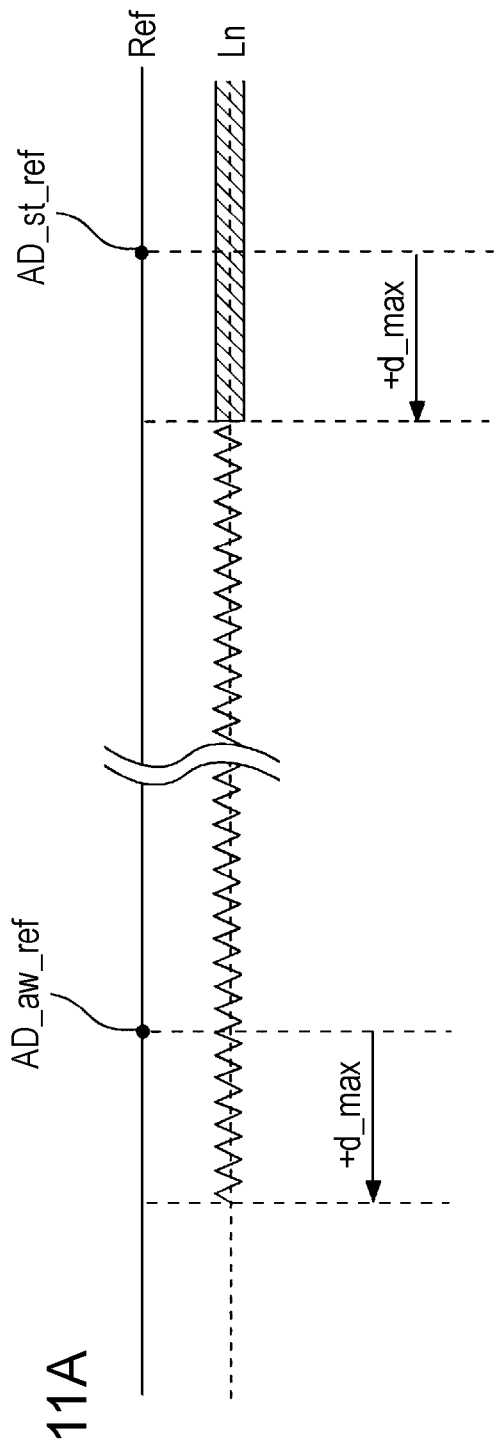
FIGS. 11A and 11B are diagrams illustrating the point to be considered during additional writing.
Figure 11B:
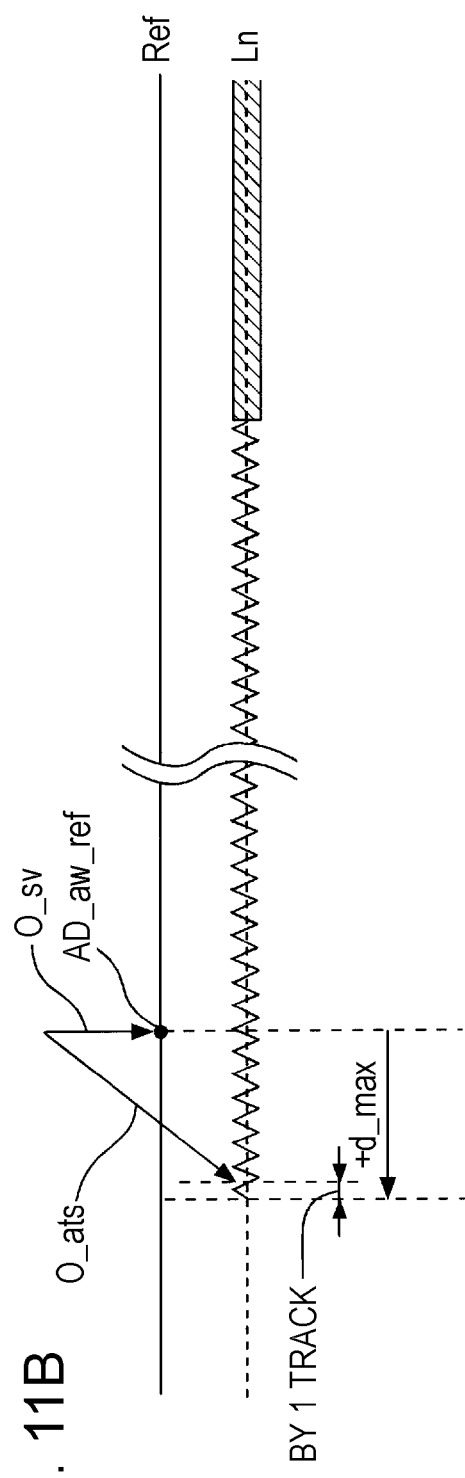

Here, FIGS. 11A and 11B are diagrams illustrating the points to be considered during additional writing.

As understood with reference to FIGS. 7 to 10 above, the recording end position by the initial recording is positioned on the foremost side (on the reverse side to the recording progress direction) in the case where, as illustrated in FIG. 9, the spot position deviation occurs due to the reverse direction side maximum spot deviation amount−d_max during the initial recording.

FIG. 11A illustrates a form after performing the initial recording in the state where the spot position deviation occurs due to the reverse direction side maximum spot deviation amount−d_max. As understood with reference to FIG. 11A, in the case where the recording end position by the initial recording is positioned on the foremost side, the recording end position by the corresponding initial recording becomes a position on the rear side from an additional writing start address AD_aw_ref (the recording start address AD_st_ref during the initial recording+the actual data recording section) by the forward direction side maximum spot deviation amount+D_max.

FIG. 11B illustrates a form when additional writing is performed after the initial recording illustrated in FIG. 11A. In addition, in FIG. 11B, a light beam O_ats in FIG. 11B means the light beam of the ATS light.

In order to perform recording by ATS in succession to the recording end position during the initial recording, servo pull-in of the ATS light to the mark row has to be performed in front of the corresponding recording end position.

Here, the point to be considered is that the spot position deviation by, as illustrated, "the forward direction side maximum spot deviation amount+d_max−1 track" may occur between the laser light for servo and the ATS light.

When such a spot position deviation occurs, the ATS light is positioned on the front side from the recording end position by the initial recording by 1 track. However, in a state where a margin to the recording end position is only 1 track as such, recording by the ATS in succession to the recording end position may not be performed.

Figure 12:
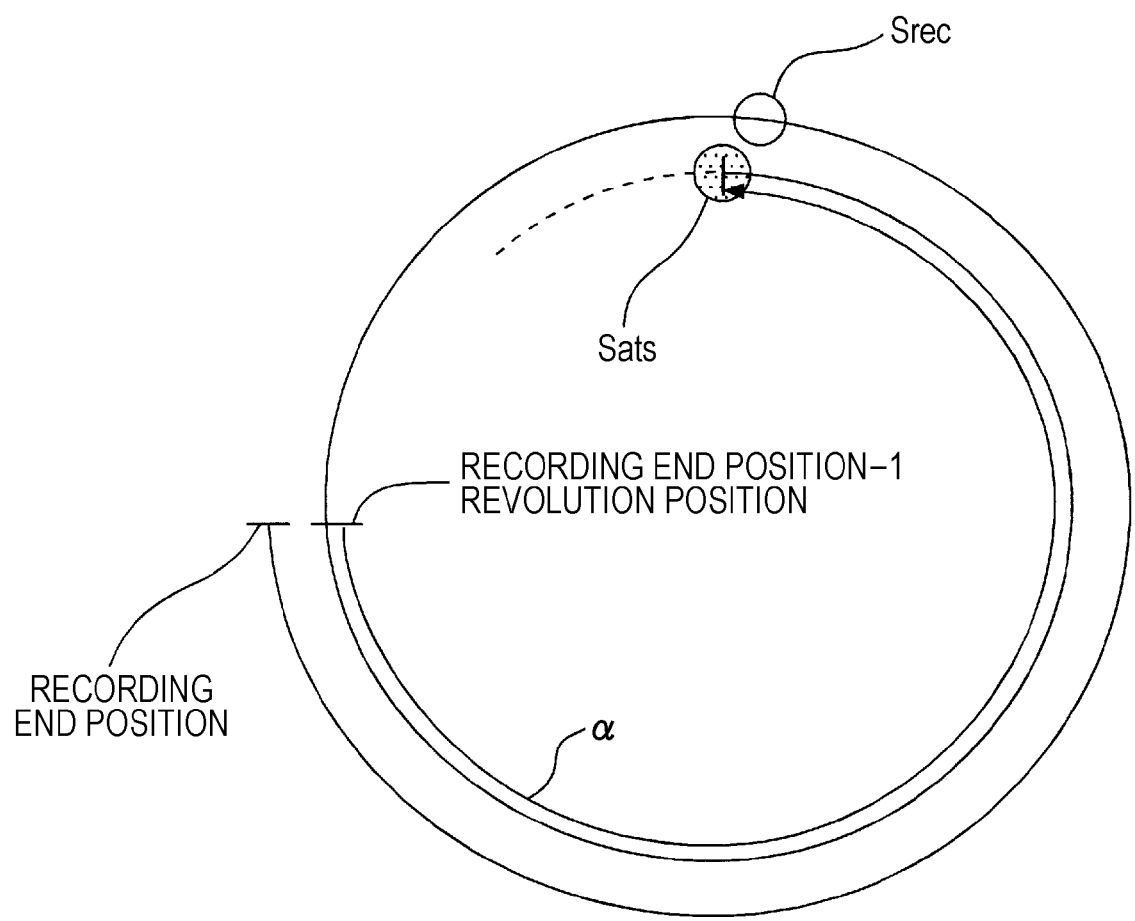
FIG. 12 is a diagram illustrating a position to access during the additional writing.

FIG. 12 is a diagram illustrating this point.

In the case shown in FIG. 11B, the spot position of the ATS light, when the laser light for servo accesses the additional writing start address AD_aw_ref, becomes a position shown at a position of "recording end−1 revolution" in FIG. 12. In other words, a spot Srec for recording at this time is disposed at the recording end position.

It is natural that since pull-in of the ATS is not immediately completed at the point that the laser light for servo accesses, if the above-described state occurs, recording by the ATS in succession to the recording end position may not be smoothly performed.

As such, during additional writing, when the laser light for servo is simply caused to access the additional writing start address AD_aw_ref, there may be a case where there is no margin to perform pull-in of the ATS and thus recording by the ATS in succession to the recording end position is not smoothly started.

Here, in this example, during the additional writing, access to an address in front of the additional writing start address AD_aw_ref by a section α for the pull-in of the ATS is made.

Accordingly, during the access, the spot of the ATS light (the spot Sats for adjacent track servo) is caused to be at the position (at a position of the recording end position−1 revolution−α) in front of the recording end position by 1 revolution and the section α as illustrated FIG. 12. Therefore, the pull-in of the ATS is appropriately performed at the section α after switching from the tracking servo by the laser light for servo to the ATS. As a result, the recording by the ATS is smoothly performed in succession to the recording end position.

1-4. Process Order

Figure 13:
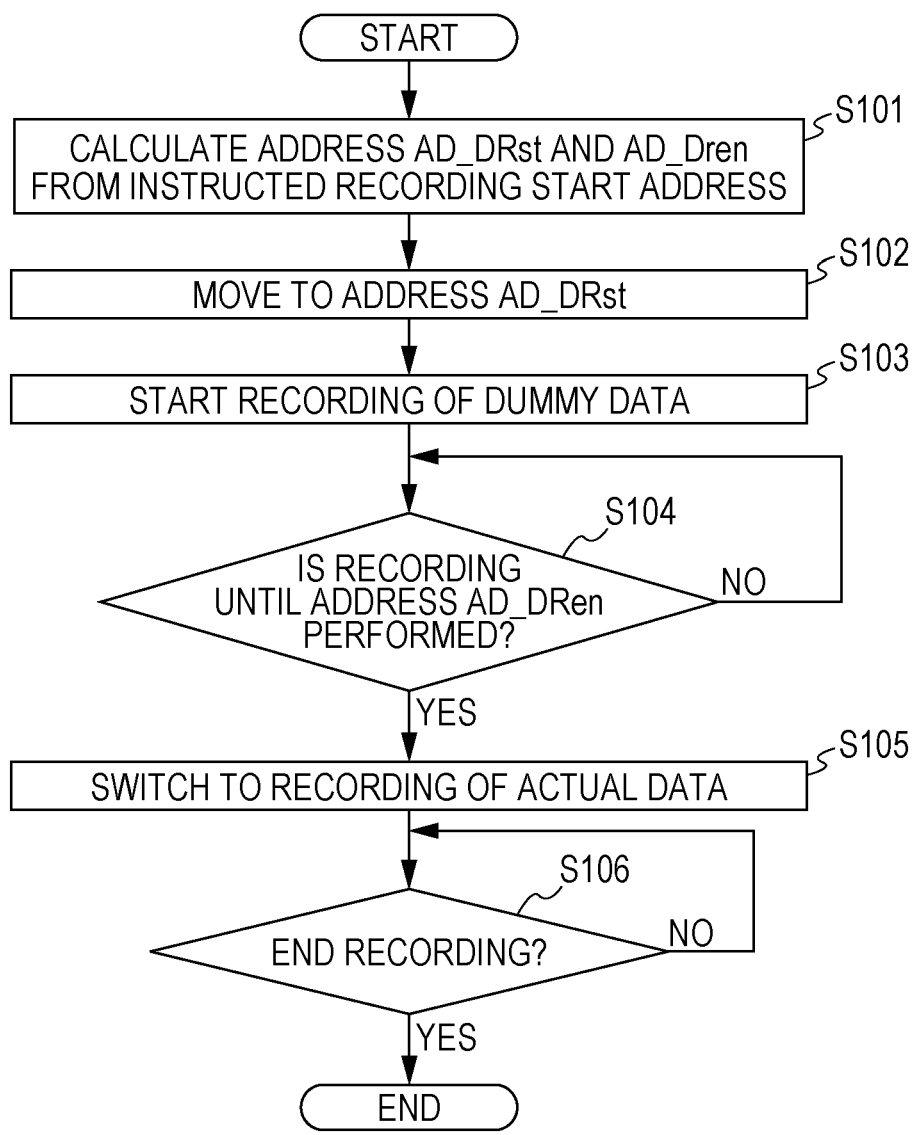
FIG. 13 is a flowchart showing the order of specific processes to be performed in order to realize a recording method during initial recording according to a first embodiment.

FIG. 13 is a flowchart showing the order of specific processes to be performed in order to realize the recording method during the initial recording according to the first embodiment described above.

Figure 14:
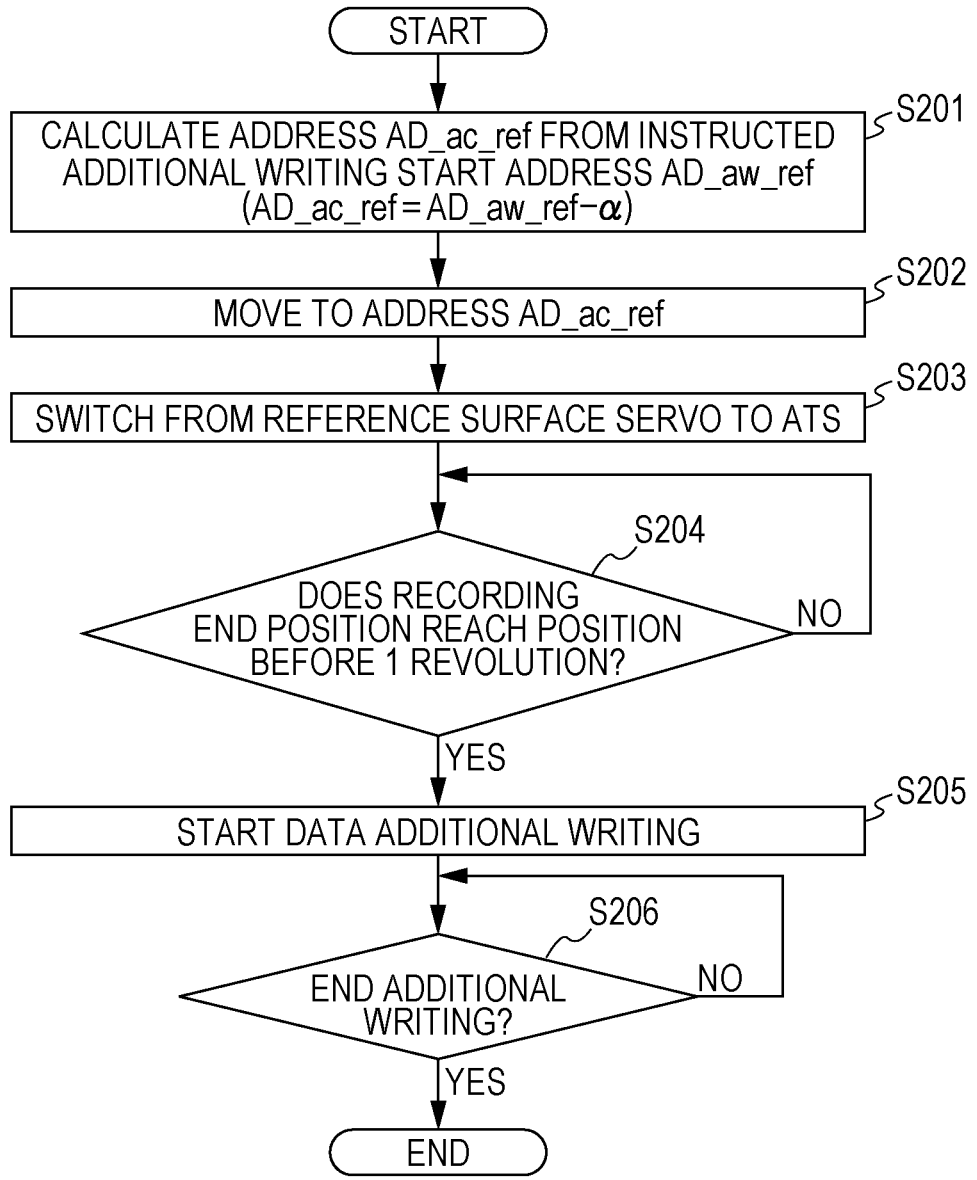
FIG. 14 is a flowchart showing the order of specific processes to be performed in order to realize the recording method during the additional writing according to the embodiment.

In addition, FIG. 14 is a flowchart showing the order of specific processes to be performed in order to realize the recording method during additional writing described above.

The processes shown in FIGS. 13 and 14 are performed by the controller 42 illustrated in FIG. 4 according to the programs stored in the above-mentioned memory such as the ROM.

First, during the initial recording shown in FIG. 13, in Step S101, a process of calculating the addresses AD_DRst and AD_DRen from the instructed recording start address AD_st_ref is performed.

In the controller 42, information of the above-mentioned maximum spot deviation amount D_max is set in advance. The controller 42 calculates the addresses AD_DRst and AD_DRen on the basis of the information of the maximum spot deviation amount D_max and the recording start address AD_st_ref instructed by, for example, an external host computer.

As also described above, in this embodiment based on the premise that the ATS light is used as the laser light for reproduction, the address AD_DRst is set to an address at a position on the front side at least from the recording start address AD_st_ref by "the maximum spot deviation amount D_max+1 track" or greater. Specifically, in this example, the address at a position on the front side from the recording start address AD_st_ref accurately by "the maximum spot deviation amount D_max+1 track" is set.

In addition, the address AD_DRen may be set to an address at a position on the rear side at least from the instructed recording start address AD_st_ref by the maximum spot deviation amount D_max or greater. Specifically, in this example, the address at a position on the rear side from the recording start address AD_st_ref accurately by the maximum spot deviation amount D_max is set.

In addition, it is described above that even when the address AD_DRen is set to "the address at a position on the rear side from the recording start address AD_st_ref by the maximum spot deviation amount D_max−1 track" or greater, there is no difference in the effect.

After calculating the addresses AD_DRst and AD_DRen, in Step S102, a process for moving to the address AD_DRst is performed. That is, control of the servo circuit 37 and necessary parts is performed to move the illumination spot of the laser light for servo to move to the address AD_DRst.

In subsequent Step S103, a recording start process of the dummy data is performed. That is, as the movement of the illumination spot of the laser light for servo to the address AD_DRst is completed, the recording processing unit 31 is instructed to start recording of the dummy data.

Just for confirmation, during recording of the dummy data and during recording of actual data for initial recording, focus servo control of the objective lens 20 is performed by the servo circuit 37 for servo light (that is, performed to cause the focal position of the laser light for servo to follow the reference surface Ref), and the focal position of the laser light for recording is aligned with the information recording layer position Ln as a recording object according to the offset of-L by driving the lens driving unit 16.

After starting the recording of the dummy data, in Step S104, the process waits for the recording until the address AD_DRen to be completed.

When the completion of the recording to the address AD_DRen is confirmed on the basis of the address information from the position information detection unit 36, the process proceeds to Step S105.

In Step S105, a process for switching to the recording of the actual data is performed. That is, the recording processing unit 31 is instructed to start recording of the data instructed from the above-described recording start address AD_st_ref.

In subsequent Step S106, the process waits for the end of the recording.

In Step S106, when the recording of the actual data is ended, a series of operations for processing of the initial recording shown in FIG. 13 is ended.

Subsequently, during additional writing shown in FIG. 14, in Step S201, the address AD_ac_ref is calculated from the instructed additional writing start address AD_aw_ref.

Here, the address AD_ac_ref means an address to access during the additional writing described with reference to FIGS. 11B and 12, and specifically is:

$AD\_ac\_ref = \text{address } AD\_aw\_ref - \alpha.$

That is, the address AD_ac_ref is an address on the front side from the instructed additional writing start address AD_aw_ref by the section α.

After calculating the address AD_ac_ref, in Step S202, a process for moving to the address AD_ac_ref is performed.

Thereafter, in Step S203, a process for switching the reference surface servo to the ATS is performed. That is, the servo circuit 37 for servo light and the servo circuit 34 for use during ATS and reproduction are instructed (operation stop and start instructions) and a switching instruction is applied to the selector 39 to switch from the tracking servo control by the servo circuit 37 for servo light to the tracking servo control by the servo circuit 34 for use during ATS and reproduction.

In addition, as described above, the focus servo control during the ATS is performed by the servo circuit 34 for use during ATS and reproduction on the basis of the reflected light of the ATS light, so that controller 42 applies the switching instruction to the selector 38 for this.

In addition, as understood from the above description, as the servo switching is performed in Step S203, servo pull-in of the ATS is made.

After the servo switching process is performed in Step S203, the process waits for a position in front of the recording end position by 1 revolution to be reached in Step S204. That is, on the basis of the address information from the address detection circuit 33a, the process waits for the illumination spot (Sats) of the ATS light to reach the position in front of the recording end position by 1 revolution (in other words, the spot Srec for recording reaches the recording end position).

As the spot of the ATS light reaches the position in front of the recording end position by 1 revolution, in Step S205, a data additional writing start process is performed. That is, by instructing the recording processing unit 31, recording of the data instructed from the additional writing start address AD_aw_ref is started.

After starting the additional writing of the data, the process waits for the additional writing to be completed in Step S206, and when the additional writing is completed, a series of processes during the additional writing shown in FIG. 14 is ended.

Figure 15:
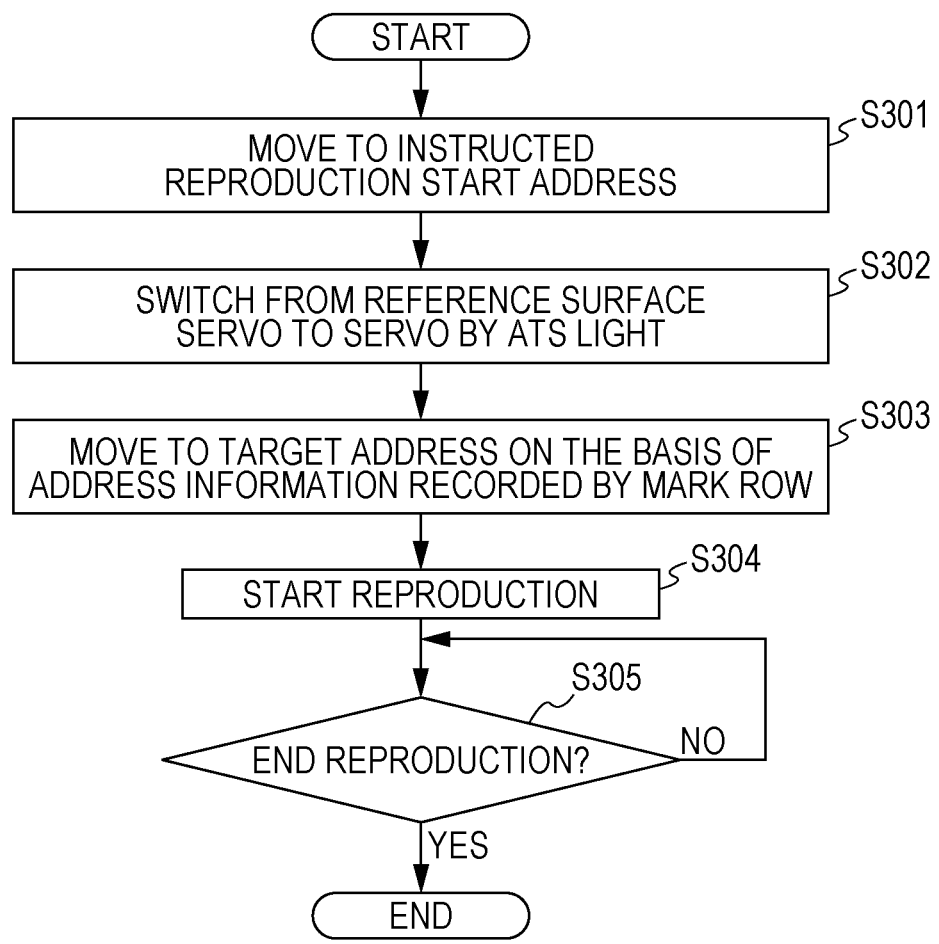
FIG. 15 is a flowchart showing the order of specific processes to be performed during reproduction of data recorded by the method according to the embodiment.

Here, for configuration, in the flowchart of FIG. 15, the order of specific processes to be performed for the recording of the data recorded in the method as the embodiment is shown.

In addition, the processes shown in FIG. 15 are performed by the controller 42 according to the programs stored in the above-mentioned memory such as the ROM.

First, in Step S301, a process for moving to an instructed recording start address is performed.

That is, for example, in the case of an instruction to reproduce actual data recorded by initial recording, a process for moving to the address AD_st_ref as the instructed reproduction start address is performed. Otherwise, in the case of an instruction to reproduce additionally written actual data, a process for moving to the address AD_aw_ref as the instructed reproduction start address is performed.

Here, as the focus servo control during access for the reproduction, the focus servo control by the servo circuit 37 for servo light is performed. In addition, along with this, during access for reproduction, the lens driving unit 16 is driven on the basis of the offset of-L corresponding to the information recording layer position Ln as a reproduction object.

As the movement to the reproduction start address is completed, in Step S302, a process for switching from the reference surface side servo to the servo by the ATS light is performed. That is, a process for switching from the tracking servo control by the servo circuit 37 for servo light to the tracking servo control by the servo circuit 34 for use during ATS and reproduction is performed.

As understood from the above description, according to the recording method of this example, it is guaranteed that the illumination spot of the ATS light is reliably positioned in the mark formation area at a timing at which switching from the reference surface servo to the servo by the ATS light is performed.

Here, with regard to the servo switching during reproduction as such, switching of the focus servo control to the focus servo control by the servo circuit 34 for use during ATS and reproduction is performed.

In subsequent Step S303, a process for moving to a target address is performed on the basis of the address information recorded by the mark row.

That is, a process for moving to a target address, using an address at which reproduction is to be started (an address corresponding to the address AD_st_ref or the address AD_aw_ref from among the addresses on the mark row) as the target address, is performed.

Here, in a case where the current address and the target address are separated at a predetermined distance or greater, the moving process is performed also using a track jump and the like. In addition, when the current address is close to the target address by the predetermined distance or greater, the target address is reached by a rotation standby.

In addition, as the target address is reached, a reproduction starting process is performed. That is, data reproduction from the target address (a reproduction start address at the information recording layer position Ln) is started by instructing the reproduction processing unit 33.

Figure 17:
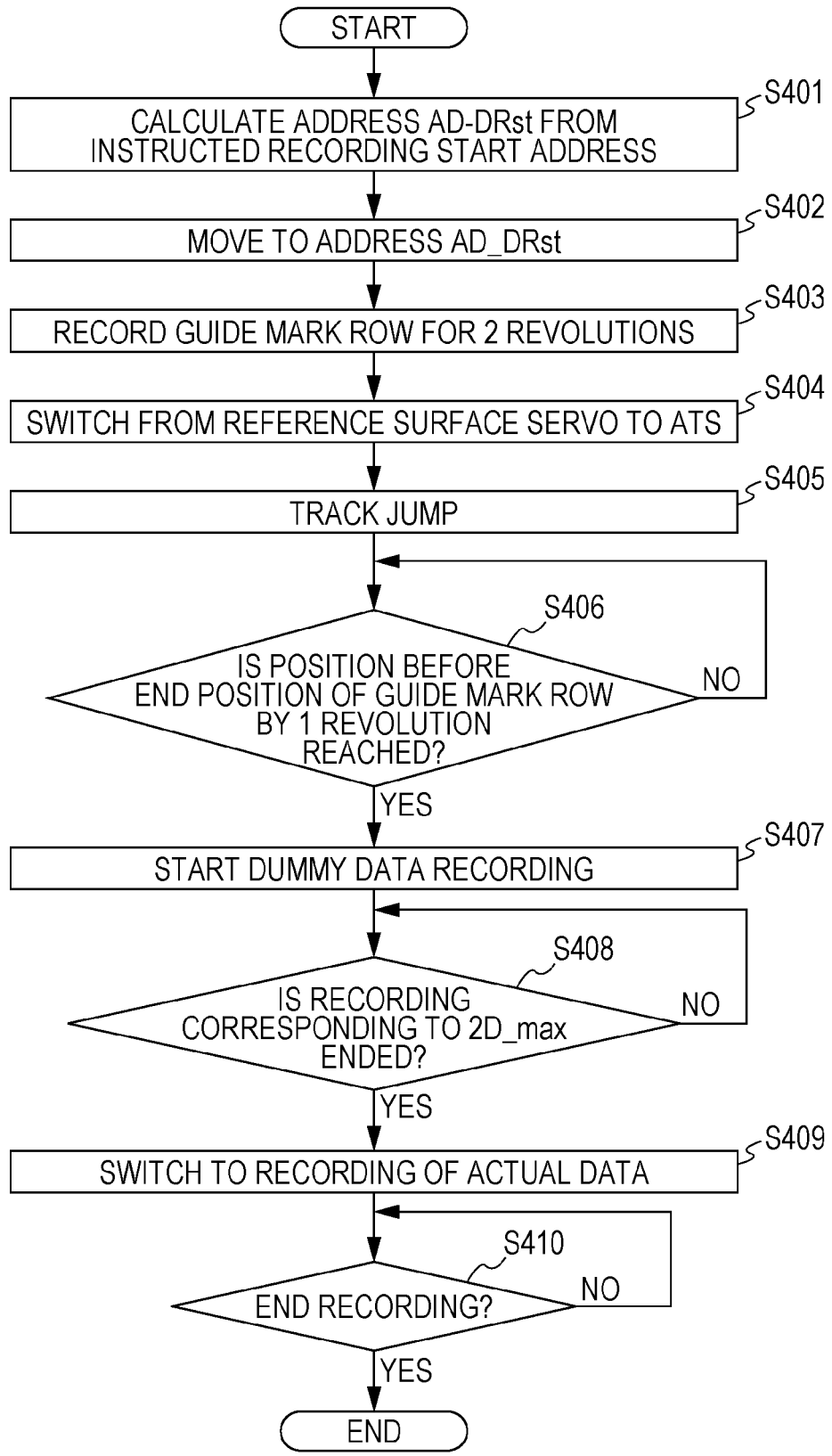
FIG. 17 is a flowchart showing the order of specific processes to be performed in order to realize the recording method during the initial recording according to the second embodiment.

After performing the reproduction start process, in Step S305, the process waits for the end of the reproduction, and when the reproduction is ended, a series of processes during reproduction shown in FIG. 17 is ended.

2. Second Embodiment

2-1. Recording Method as Second Embodiment

According to a second embodiment, recording is performed by ATS even during initial recording.

Here, in the description until now, eccentricity or disc tilt is considered as the factor of the spot position deviation. However, the spot position deviation may be generated by looseness of, as the slide driving unit, a mechanism part for driving the entire optical pickup OP in the tracking direction. That is, during slide servo control for the slide driving unit, when the looseness of the mechanism part occurs, as the position of the optical pickup OP is displaced rapidly (momentarily), the position of the objective lens 20 is shifted to absorb the displacement during the tracking servo control. Also due to the lens shift, there is a concern that a spot position deviation between the laser light for servo and the laser light for recording may occur. This means that even when the disc is not replaced, a spot position deviation occurs.

Here, in the second embodiment, even during the initial recording, recording is performed by the ATS, so that overlapping or intersecting of the mark rows is more reliably prevented.

In addition, even in the second embodiment, the configuration of the recording apparatus is the same as that of the first embodiment (except for the controller 42), so that repeated description by illustration will be omitted.

Here, during the initial recording, unlike the additional writing, already recorded mark rows do not exist in front of a position at which recording is to be started. Therefore, when recording is performed by ATS during initial recording, a guide mark row for pull-in of ATS has to be recorded.

Figure 16:
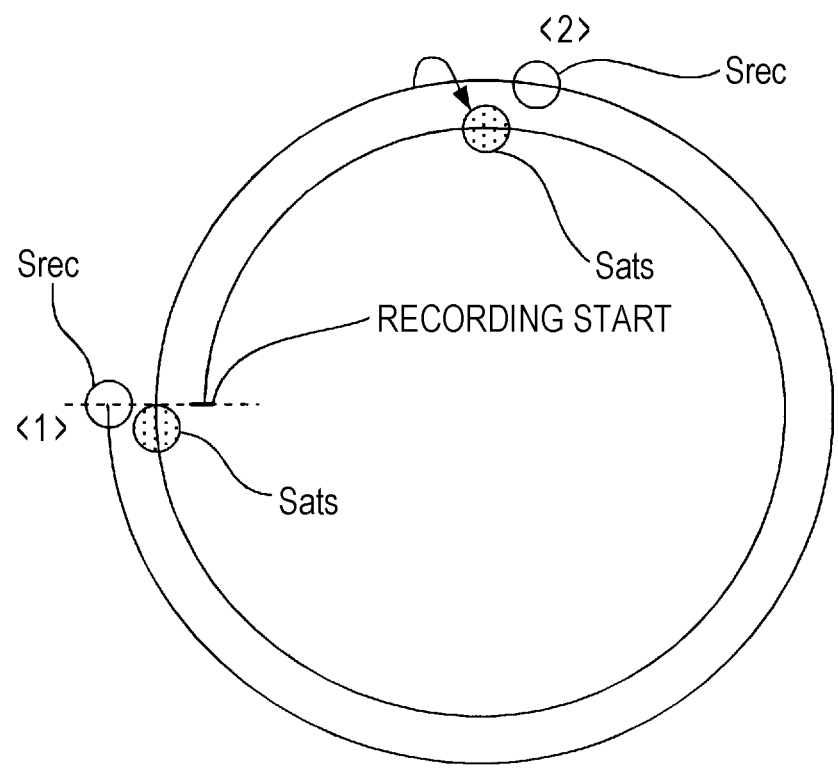
FIG. 16 is a diagram illustrating a recording method during initial recording according to a second embodiment.

FIG. 16 is a diagram illustrating the recording method during the initial recording of the second embodiment. Specifically, FIG. 16 is a diagram illustrating a specific recording method of the guide mark row for ATS pull-in as such.

Here, in the second embodiment, like during the initial recording of the first embodiment, recording of the dummy data is also performed. Therefore, the recording of the guide mark row here is performed while accessing the above-described dummy data recording start address AD_DRst.

In FIG. 16, the position shown as a "recording start" becomes a position of the spot Srec for recording when the laser light for servo accesses the dummy data recording start address AD_DRst on the reference surface Ref.

That is, in the second embodiment, after the dummy data recording start address AD_DRst is calculated from the instructed recording start address AD_st_ref, as the corresponding dummy data recording start address AD_DRst is accessed, recording of the dummy data by the laser light for recording is started. That is, a recording section of the dummy data started as such functions as the guide mark row.

Here, recording of the dummy data as the guide mark row is performed at least for 2 revolutions.

<1> in FIG. 16 represents a positional relationship between the spot Srec for recording and the illumination spot Sats of the ATS light (spot for adjacent track servo) at a time point at which recording of the guide mark row for 2 revolutions is completed.

In addition, in this example, the guide mark row is recorded accurately for 2 revolutions.

In addition, in the second embodiment, as the recording of the guide mark row for 2 revolutions is completed, first, switching from the tracking servo control by the laser light for servo to the track servo control by the ATS light is performed.

As can be seen with reference to FIG. 16, in this case, since the guide mark row is recorded for 1 revolution or longer, the illustration spot Sats of the ATS light is positioned on the already recorded mark row. Therefore, by the servo switching, it becomes possible to perform servo pull-in to the mark row where recording of the ATS light is ended.

In addition, after performing the servo switching as such, as indicated by <2> in FIG. 16, the illustration spot Sats of the ATS light is jumped to the mark row on the front side. In this case, the illumination spot is jumped to a position before one mark row.

As the jump operation is performed, the illumination spot Sats of the ATS light is positioned on the front side of the position at which recording is to be started (the position in front from the end position of the guide mark row by 1 revolution). Accordingly, in succession to the end of the guide mark row, recording of the dummy data by ATS can be smoothly performed.

For confirmation, in order to allow the operation for jumping to the front side which is for realizing smooth recording of the dummy data by ATS in succession to the guide mark row to be performed, recording of the guide mark row may be performed at least for 2 revolutions.

Here, unlike the first embodiment, the initial recording of the second embodiment is not performed under the tracking servo control by the laser light for servo. Therefore, a position at which the recording of the dummy data has to be ended may not be detected on the basis of the address information of the reference surface Ref unlike the first embodiment.

Therefore, in the second embodiment, the recording end position of the dummy data is detected on the basis of a recording length of the dummy data.

Specifically, in this example, as an address at a position on the front side from the recording start address AD_st_ref by "the maximum spot deviation amount D_max+1 track" is calculated as the dummy data recording start address AD_DRst, and recording of the dummy data is performed over a section of "2D_max+1 track", switching to recording of actual data is performed.

Accordingly, the end of recording of the dummy data (the recording start position of the actual data) may be at the same position as that of the first embodiment.

In addition, on the premise that a laser light having the same optical axis as that of the laser light for recording is used as the laser light for reproduction, as recording of the dummy data over the section of 2D_max is performed, switching to the recording of the actual data may be performed.

In addition, even in the second embodiment, the recording method during additional writing and the reproduction method are the same as those described in the first embodiment, so that repeated description thereof will be omitted.

2-2. Process Order

FIG. 17 is a flowchart showing the order of specific processes to be performed in order to realize the recording method during the initial recording according to the second embodiment described above.

In addition, the processes shown in FIG. 17 are performed by the controller 42 according to the programs stored in the above-mentioned memory such as the ROM.

In FIG. 17, in Step S401, the address AD_DRst is calculated from the instructed recording start address AD_st_ref. That is, in this example, the address at a position on the front side from the recording start address AD_st_ref by "the maximum spot deviation amount D_max+1 track" is calculated as the address AD_DRst.

In subsequent Step S402, a process for moving to the address AD_DRst is performed.

In addition, as the movement to the address AD_DRst is completed, in Step S403, a process for recording a guide mark row for 2 revolutions is performed. That is, as recording of the guide mark row for 2 revolutions, recording of dummy data for 2 revolutions is performed.

As the recording of the guide mark row for 2 revolutions is completed, in Step S404, a process for switching from the reference surface servo to the ATS is performed.

As understood from the above description, by performing servo switching at such a timing, pull-in of the ATS light to the already recorded mark row becomes possible.

After the servo switching process is performed by Step S404, in Step S405, a track jump process is performed. That is, by instructing the servo circuit 34 for use during ATS and reproduction, a track jump operation to a position before 1 mark row is performed.

After the track jump process is performed, in Step S406, the process waits for reaching a position before the end position of the guide mark row by 1 revolution. That is, on the basis of the address information from the address detection circuit 33a, the process waits for the illumination spot Sats of the ATS light to reach a position before the end position of the guide mark row by 1 revolution.

In addition, as the illumination spot Sats reaches the position before the end position of the guide mark row by 1 revolution, in Step S407, a recording start process of the dummy data is performed.

Moreover, after the recording of the dummy data is started, in Step S408, the process waits for the recording corresponding to 2D_max to end. That is, in this example, the process waits until recording of the dummy data is performed over the section of "2D_max+1 track".

As the recording of the dummy data corresponding to 2D_max is ended, a process for switching to the recording of the actual data is performed in Step S409.

In addition, after the corresponding switching process is performed, in Step S410, the process waits until the recording of the actual data is ended, and when the recording of the actual data is ended, a series of the processes during the initial recording shown in FIG. 17 is ended.

3. Modified Example

While the embodiments of the disclosure have been described, the disclosure is not limited to the specific embodiments described above.

For example, although not particularly mentioned in the foregoing description, the maximum spot deviation amounts D_max of the information recording layer positions L as recording objects are strictly different from each other. This is based on the fact that the collimation state of the laser light for recording incident on the objective lens 20 becomes different in each of the information recording layer positions L as recording objects.

In correspondence with the fact that the maximum spot deviation amounts D-max at the information recording layer positions L are different from each other, setting of the dummy data recording start address AD_DRst and the dummy data recording end address AD_DRen may be performed using the information of the maximum spot deviation amount D_max corresponding to each of the information recording layer positions L.

Otherwise, the maximum spot deviation amount D_max at the information recording layer position L of which the maximum spot deviation amount D_max becomes largest is commonly used to set the dummy data recording start address AD_DRst and the dummy data recording end address AD_DRen at each of the information recording layer positions L.

In addition, in the foregoing description, the case where the optical disc recording medium as the recording object according to the disclosure is a bulk-type recording medium is exemplified. However, the disclosure may also be appropriately applied to an optical disc recording medium (a multi-layer recording medium 50) provided with, instead of the bulk layer 5, for example, a recording layer having a multi-layer structure in which a plurality of recording films is formed as illustrated in FIG. 18.

Figure 18:
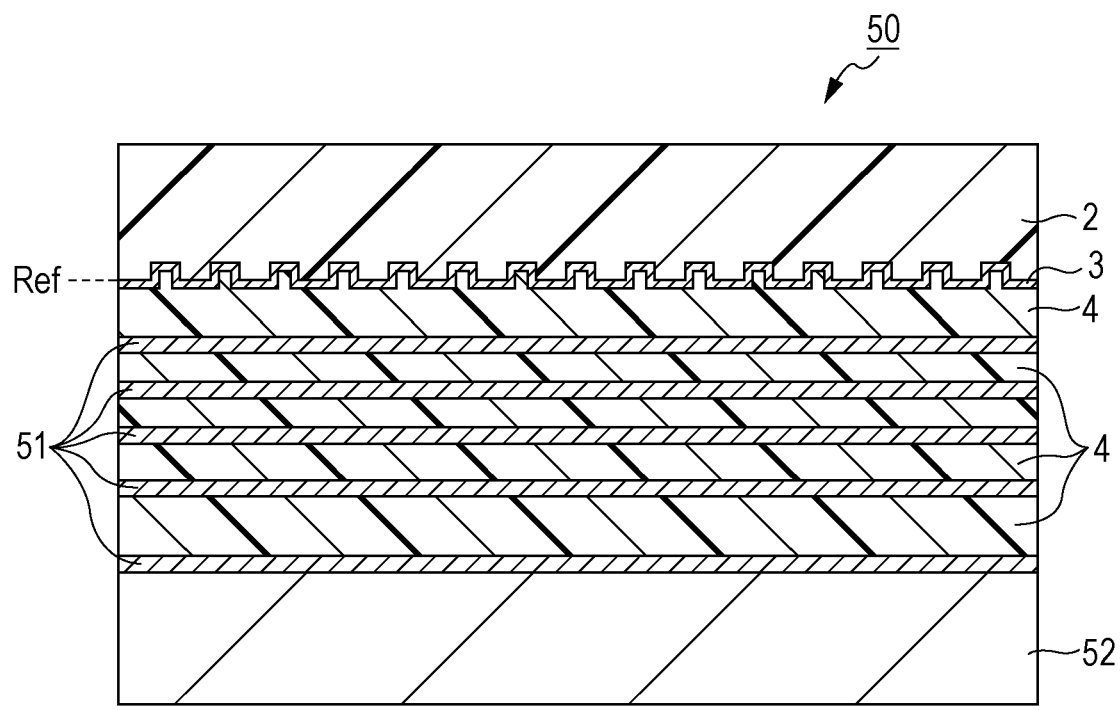
FIG. 18 shows a cross-sectional structure of an optical recording medium as a modified example.
Figure 19:
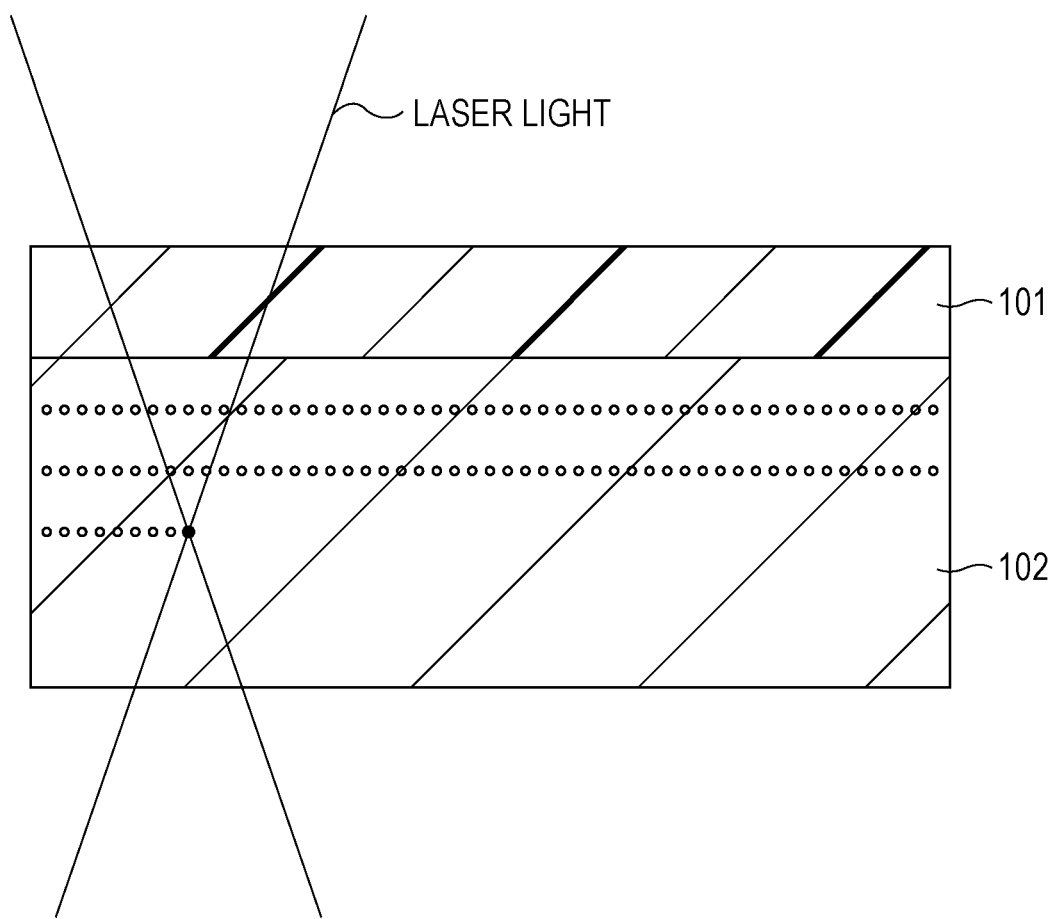
FIG. 19 is a diagram illustrating a bulk recording method.
Figure 20:
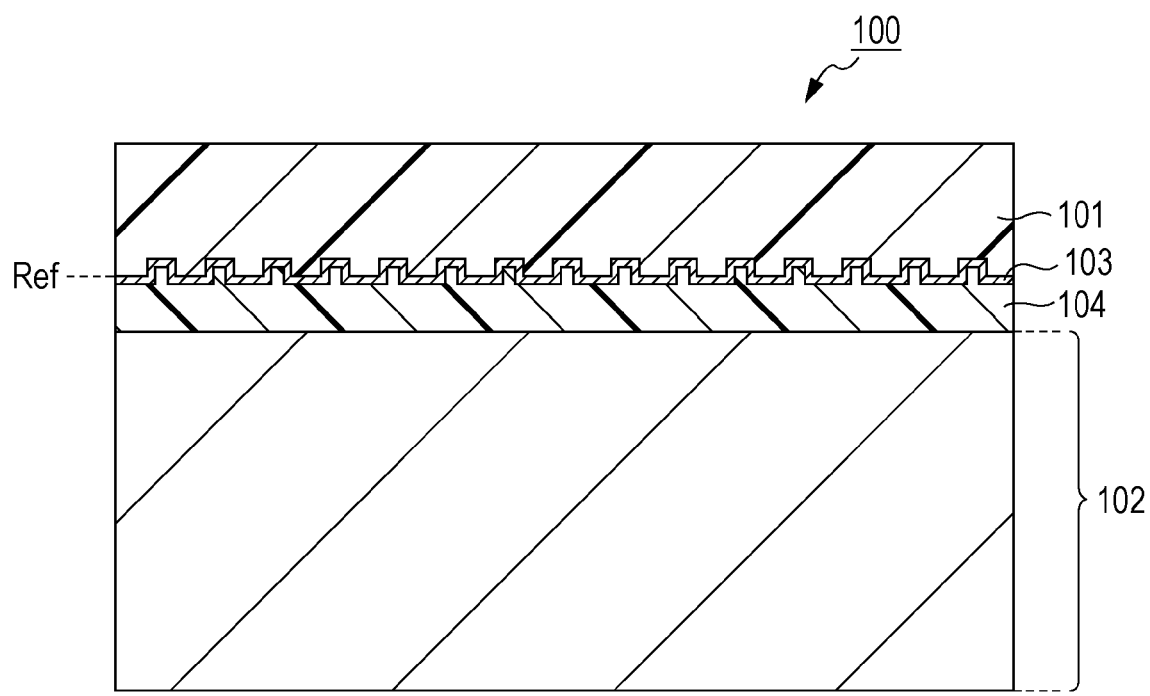
FIG. 20 is a diagram illustrating the cross-sectional structure of an actual bulk-type recording medium having a reference surface.

In FIG. 18, the multi-layer recording medium 50 has the same configuration as the bulk-type recording medium 1 illustrated in FIG. 1 in that a cover layer 2, a selective reflection film 3, and an intermediate layer 4 are formed in this order from the upper layer side. However, in this case, instead of the bulk layer 5, the recording layer having a layer structure in which a translucent recording film 51 and the intermediate layer 4 are repeatedly laminated a predetermined number of times. The translucent recording film 51 formed at the lowermost layer as illustrated is laminated on a substrate 52. In addition, as the recording film formed at the lowermost layer, a total reflection recording film may be used.

Here, the point to be considered is that position guiding elements accompanied with the formation of grooves or pit rows are not formed on the translucent recording film 51. That is, even in the multi-layer recording medium 50, the position guiding elements are formed only at a single layer position as the reference surface Ref.

Since the translucent recording films 51 that function as reflection films are formed on the recording layers of the multi-layer recording medium 50, reflected light can be obtained even when marks are not in a recorded state. That is, the focus servo control during recording can be performed on the basis of the reflected light from the recording layers.

In the foregoing description, the case where the reference surface is provided on the upper layer side of the recording layer is exemplified. However, the reference surface may also be provided on the lower layer side of the recording layer.

In addition, in the foregoing description, the case where the disclosure is applied to a recording and reproduction apparatus which performs both recording and reproduction on an optical disc recording medium (recording layer) is exemplified. However, the disclosure may also be appropriately applied to a recording-dedicated apparatus (recording apparatus) which can perform only recording on an optical disc recording medium (recording layer).

The present disclosure contains subject matter related to that disclosed in Japanese Priority Patent Application JP 2010-248433 filed in the Japan Patent Office on Nov. 5, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording apparatus comprising:
a light illumination and light sensing unit which is configured to illuminate an optical disc recording medium having a reference surface on which address information is recorded by formation of a position guiding element and a recording layer which is formed at a different depth position from that of the reference surface, with recording light for performing mark recording on the recording layer and light for position control for performing position control based on the position guiding element formed on the reference surface, via a common objective lens, and is configured to receive reflected light of the light for position control from the reference surface;
a tracking mechanism which drives the objective lens in a tracking direction that is a direction parallel to a radial direction of the optical disc recording medium;
a reference surface side tracking servo control unit which performs, by driving the tracking mechanism on the basis of a light sensing signal for the light for position control obtained by the light illumination and light sensing unit, reference surface side tracking servo control for causing an illumination spot of the light for position control to follow the position guiding element formed on the reference surface;
a recording unit which performs recording on the recording layer by driving a light source of the recording light to emit light; and
a control unit,
wherein the control unit controls, in a state where data instructed to be recorded is to be recorded from an instructed recording start address, the recording unit to perform recording of dummy data on an area adjacent to a front side at least from the recording start address over a range of equal to or greater than the maximum spot deviation amount which is the maximum amount of a position deviation amount in the radial direction between the illumination spot of the light for position control and an illumination spot of the recording light which may occur in a state where tracking servo is performed by the reference surface side tracking servo control unit and to perform recording of the data instructed to be recorded in succession to a recorded area of the dummy data.

2. The recording apparatus according to claim 1, wherein the control unit performs the recording of the dummy data even on an area after the recording start address over the range of equal to or greater than the maximum spot deviation amount.

3. The recording apparatus according to claim 2,
wherein the light illumination and light sensing unit is configured to cause ATS light for adjacent track servo along with the recording light and the light for position control to illuminate via the objective lens and to independently receive reflected light of the ATS light from the recording light,
an adjacent track servo control unit is further included which performs adjacent track servo control for causing an illumination spot of the ATS light to follow the mark row recorded on the recording layer by driving the tracking mechanism on the basis of a light sensing signal for the ATS light obtained by the light illumination and light sensing unit, and
the control unit, during recording of data instructed to be additionally written, performs control to perform recording of the data instructed to be additionally written under tracking servo control performed by the adjacent track servo control unit.

4. The recording apparatus according to claim 3,
wherein the recording unit is configured to record the data instructed to be recorded and address information,
a reproduction unit which performs reproduction of the information recorded by the mark on the basis of the light sensing signal for the ATS light, and
the control unit, in a state where the data instructed to be additionally written is to be recorded from an additional writing start address, moves an illumination spot position of the light for position control to an address in front from the additional writing start address at least by a section for servo pull-in, performs control for switching the tracking servo control of the objective lens from the reference surface side tracking servo control to the adjacent track servo control, and controls the recording unit to perform recording from the additional writing start address on the basis of the address information obtained by the reproduction unit after switching to the adjacent track servo control.

5. The recording apparatus according to claim 3, wherein, during initial recording, the control unit performs control to perform the recording of the dummy data under tracking servo control performed by the reference surface side tracking servo control unit.

6. The recording apparatus according to claim 3, wherein, during the initial recording, the control performs control to perform the recording of the dummy data under the tracking servo control performed by the adjacent track servo control unit.

7. The recording apparatus according to claim 6,
wherein the recording unit is configured to record the data instructed to be recorded and address information,
a reproduction unit is further included which performs reproduction of the information recorded by the mark on the basis of the light sensing signal for the ATS light,
the control unit, during the initial recording, moves an illumination spot position of the light for position control to an address in front from the recording start address at least by the maximum spot deviation amount or greater, performs recording a guide mark row at least for 2 revolutions, performs control for switching the tracking servo control of the objective lens from the reference surface side tracking servo control to the adjacent track servo control, causes the illumination spot of the ATS light to jump to the guide mark row before 1 revolution, and controls the recording unit to perform the recording of the dummy data from a succeeding portion of the guide mark row on the basis of the address information obtained by the reproduction unit after the jump.

8. A recording method used in a recording apparatus which includes a light illumination and light sensing unit which is configured to illuminate an optical disc recording medium having a reference surface on which address information is recorded by formation of a position guiding element and a recording layer which is formed at a different depth position from that of the reference surface, with recording light for performing mark recording on the recording layer and light for position control for performing position control based on the position guiding element formed on the reference surface, via a common objective lens, and is configured to receive reflected light of the light for position control from the reference surface, a tracking mechanism which drives the objective lens in a tracking direction that is a direction parallel to a radial direction of the optical disc recording medium, a reference surface side tracking servo control unit which performs, by driving the tracking mechanism on the basis of a light sensing signal for the light for position control obtained by the light illumination and light sensing unit, reference surface side tracking servo control for causing an illumination spot of the light for position control to follow the position guiding element formed on the reference surface, and a recording unit which performs recording on the recording layer by driving a light source of the recording light to emit light, the recording method comprising:

in a state where data instructed to be recorded is to be recorded from an instructed recording start address, performing recording of dummy data on an area adjacent to a front side at least from the recording start address over a range of equal to or greater than the maximum spot deviation amount which is the maximum amount of a position deviation amount in the radial direction between the illumination spot of the light for position control and an illumination spot of the recording light which may occur in a state where tracking servo is performed by the reference surface side tracking servo control unit; and performing recording of the data instructed to be recorded in succession to a recorded area of the dummy data.

\* \* \* \* \*